(12) United States Patent
Morton et al.

(10) Patent No.: US 10,498,858 B2
(45) Date of Patent: Dec. 3, 2019

(54) SYSTEM AND METHOD FOR AUTOMATED ON-DEMAND CREATION OF AND EXECUTION OF A CUSTOMIZED DATA INTEGRATION SOFTWARE APPLICATION

(71) Applicant: Dell Products, LP, Round Rock, TX (US)

(72) Inventors: Michael J. Morton, Morrisville, NC (US); Richard A. Backhouse, Apex, NC (US)

(73) Assignee: Dell Products, LP, Round Rock, TX (US)

( * ) Notice: Subject to any disclaimer, the term of this patent is extended or adjusted under 35 U.S.C. 154(b) by 370 days.

(21) Appl. No.: 15/379,456

(22) Filed: Dec. 14, 2016

(65) Prior Publication Data

US 2018/0167490 A1 Jun. 14, 2018

(51) Int. Cl.
*G06F 15/173* (2006.01)
*H04L 29/08* (2006.01)
*G06F 3/16* (2006.01)
*H04L 29/06* (2006.01)

(52) U.S. Cl.
CPC .............. *H04L 67/34* (2013.01); *G06F 3/167* (2013.01); *H04L 63/083* (2013.01)

(58) Field of Classification Search
CPC ........ H04L 67/34; H04L 63/083; G06F 3/167
USPC ......................................................... 709/223
See application file for complete search history.

(56) References Cited

U.S. PATENT DOCUMENTS

| 5,299,304 A | 3/1994 | Williams et al. |
| 5,410,675 A | 4/1995 | Shreve et al. |
| 5,794,246 A | 8/1998 | Sankaran et al. |
| 5,917,730 A | 6/1999 | Rate et al. |

(Continued)

FOREIGN PATENT DOCUMENTS

| WO | WO 02/102097 A1 | 12/2002 |
| WO | WO 2008/134627 A2 | 11/2008 |

OTHER PUBLICATIONS

"The Quest for a Cloud Integration Strategy," Boomi Whitepaper, 2011, http://marketing.boomi.com/QuestForCloudIntegration.html.

(Continued)

*Primary Examiner* — Alan S Chou
(74) *Attorney, Agent, or Firm* — Prol Intellectual Property Law, PLLC; H. Kenneth Prol

(57) ABSTRACT

An information handling system operating a voice commanded integration application management system may include a memory for storing an established customized software integration application for a specific integration process for transforming data to enable electronic data exchange between data formats, and for storing one or more internal data records associating the established customized software integration application with an authorized user, and a run-time engine. The voice commanded integration application management system may also include a processor operatively connected to the memory for receiving a first integrated data keyword from a voice recognition software system requesting access to the specific integration process from the voice recognition software system on behalf of a user, and associating the first integrated data keyword with the established customized software integration application, and for receiving user authorization.

20 Claims, 14 Drawing Sheets

(56) References Cited

U.S. PATENT DOCUMENTS

| | | |
|---|---|---|
| 5,953,533 A | 9/1999 | Fink et al. |
| 6,014,670 A | 1/2000 | Zamanian et al. |
| 6,032,158 A | 2/2000 | Mukhopadhyay et al. |
| 6,038,590 A | 3/2000 | Gish |
| 6,044,374 A | 3/2000 | Nesamoney et al. |
| 6,091,893 A | 7/2000 | Fintel |
| 6,106,569 A | 8/2000 | Bohrer et al. |
| 6,115,690 A | 9/2000 | Wong |
| 6,134,706 A | 10/2000 | Carey et al. |
| 6,208,345 B1 | 3/2001 | Sheard |
| 6,208,990 B1 | 3/2001 | Suresh et al. |
| 6,223,180 B1 | 4/2001 | Moore et al. |
| 6,339,775 B1 | 1/2002 | Zamanian et al. |
| 6,343,275 B1 | 1/2002 | Wong |
| 6,418,400 B1 | 7/2002 | Webber |
| 6,626,957 B1 | 9/2003 | Lippert et al. |
| 6,640,226 B1 | 10/2003 | Shringeri et al. |
| 6,725,231 B2 | 4/2004 | Hu et al. |
| 6,785,685 B2 | 8/2004 | Soetarman et al. |
| 6,789,096 B2 | 9/2004 | Sankaran et al. |
| 6,820,077 B2 | 11/2004 | Godfredsen et al. |
| 6,820,135 B1 | 11/2004 | Dingman et al. |
| 6,823,373 B1 | 11/2004 | Pancha et al. |
| 6,848,081 B1 | 1/2005 | Yoda et al. |
| 6,850,947 B1 | 2/2005 | Chung et al. |
| 6,854,107 B2 | 2/2005 | Green et al. |
| 6,895,409 B2 | 5/2005 | Uluakar et al. |
| 6,895,471 B1 | 5/2005 | Tse et al. |
| 6,922,831 B1 | 7/2005 | Kroening et al. |
| 6,988,165 B2 | 1/2006 | White et al. |
| 6,993,743 B2 | 1/2006 | Crupi et al. |
| 6,996,584 B2 | 2/2006 | White et al. |
| 7,047,488 B2 | 5/2006 | Ingersoll et al. |
| 7,117,215 B1 | 10/2006 | Kanchwalla et al. |
| 7,162,643 B1 | 1/2007 | Sankaran et al. |
| 7,171,647 B1 | 1/2007 | Smith et al. |
| 7,181,457 B2 | 2/2007 | Reinauer et al. |
| 7,216,292 B1 | 5/2007 | Snapper et al. |
| 7,487,110 B2* | 2/2009 | Bennett .............. G06Q 30/0635 705/26.81 |
| 7,496,888 B2 | 2/2009 | Sanjar et al. |
| 7,499,951 B2 | 3/2009 | Mueller et al. |
| 7,584,192 B2 | 9/2009 | Rey et al. |
| 7,590,724 B1 | 9/2009 | Williams |
| 7,610,575 B2 | 10/2009 | Sproule |
| 7,693,720 B2* | 4/2010 | Kennewick ......... G06F 16/3329 704/275 |
| 7,698,634 B2 | 4/2010 | Bhatia et al. |
| 7,792,784 B2 | 9/2010 | Gupta |
| 7,849,440 B1 | 12/2010 | Englehart |
| 7,941,784 B2 | 5/2011 | Shenfield et al. |
| 8,010,845 B2 | 8/2011 | Rui et al. |
| 3,015,541 A1 | 9/2011 | Srinivasan |
| 8,036,939 B2 | 10/2011 | Gil et al. |
| 8,060,396 B1 | 11/2011 | Bessler et al. |
| 8,095,416 B2 | 1/2012 | Harvey et al. |
| 8,126,762 B2 | 2/2012 | Ramachandran et al. |
| 8,165,993 B2 | 4/2012 | Broda et al. |
| 8,271,615 B2 | 9/2012 | Ellison et al. |
| 8,276,115 B2 | 9/2012 | Bates et al. |
| 8,533,661 B2* | 9/2013 | Nucci .................. G06F 8/10 717/105 |
| 8,561,008 B2 | 10/2013 | Steiner |
| 10,102,591 B2* | 10/2018 | McLaughlin .......... G06Q 30/02 |
| 10,140,983 B2* | 11/2018 | Kurata .................. G10L 15/197 |
| 2001/0052112 A1 | 12/2001 | Mohan et al. |
| 2002/0016771 A1 | 2/2002 | Carothers et al. |
| 2002/0073396 A1 | 6/2002 | Crupi et al. |
| 2002/0095650 A1 | 7/2002 | Green et al. |
| 2002/0104067 A1 | 8/2002 | Green et al. |
| 2003/0221184 A1 | 11/2003 | Gunjal et al. |
| 2003/0236677 A1 | 12/2003 | Casati et al. |
| 2004/0044689 A1 | 3/2004 | Krabel et al. |
| 2004/0068431 A1 | 4/2004 | Smith et al. |
| 2004/0133876 A1 | 7/2004 | Sproule |
| 2005/0005262 A1 | 1/2005 | Mohan et al. |
| 2005/0187993 A1 | 8/2005 | Selman et al. |
| 2005/0198618 A1 | 9/2005 | Lalonde et al. |
| 2005/0209903 A1 | 9/2005 | Hunter et al. |
| 2005/0228517 A1 | 10/2005 | Tomita |
| 2005/0273758 A1 | 12/2005 | Long |
| 2006/0015619 A1 | 1/2006 | Tse et al. |
| 2006/0017947 A1 | 1/2006 | Wang et al. |
| 2006/0184933 A1 | 4/2006 | Chessell et al. |
| 2006/0161495 A1 | 7/2006 | Wigzell |
| 2006/0230066 A1 | 10/2006 | Kosov et al. |
| 2007/0061393 A1 | 3/2007 | Moore |
| 2007/0168206 A1 | 7/2007 | McCall et al. |
| 2008/0163164 A1 | 7/2008 | Chowdhary et al. |
| 2008/0196006 A1 | 8/2008 | Bates et al. |
| 2008/0209078 A1 | 8/2008 | Bates et al. |
| 2008/0243884 A1 | 10/2008 | Mehta |
| 2008/0270977 A1 | 10/2008 | Nucci et al. |
| 2008/0306973 A1 | 12/2008 | Richard |
| 2009/0112666 A1 | 4/2009 | Guo et al. |
| 2009/0171758 A1 | 7/2009 | Alfandary et al. |
| 2009/0228428 A1 | 9/2009 | Dan et al. |
| 2010/0023362 A1 | 1/2010 | Nguyen et al. |
| 2010/0031140 A1 | 2/2010 | Cummins |
| 2010/0042641 A1 | 2/2010 | Kamalakantha et al. |
| 2010/0070317 A1 | 3/2010 | Pachter et al. |
| 2010/0070556 A1 | 3/2010 | Heusermann et al. |
| 2010/0070981 A1 | 3/2010 | Hadar |
| 2010/0138257 A1 | 6/2010 | Wocher et al. |
| 2010/0169148 A1 | 7/2010 | Oberhofer et al. |
| 2010/0185510 A1 | 7/2010 | Maier et al. |
| 2010/0229111 A1 | 9/2010 | Eugene et al. |
| 2010/0306709 A1 | 12/2010 | Lynch et al. |
| 2010/0332510 A1 | 12/2010 | Gitai et al. |
| 2010/0332535 A1 | 12/2010 | Weizman et al. |
| 2011/0029575 A1 | 2/2011 | Sagi et al. |
| 2011/0078607 A1 | 3/2011 | Ryan et al. |
| 2011/0225466 A1 | 9/2011 | Resch et al. |
| 2011/0282715 A1 | 11/2011 | Nguyen et al. |
| 2012/0041945 A1 | 2/2012 | Blubaugh |
| 2012/0246573 A1 | 9/2012 | Arokiaswamy |

OTHER PUBLICATIONS

Boomi AtomSphere Help, Boomi, Inc., Apr. 29, 2010 web.archive. org/web/20100429065017/http://help.boomi/display/BOD/Boomi+AtomSphere+Help.

Boomi AtomSphere Build, Boomi, Inc., Apr. 29, 2010 web.archive. org/web/20100429041219/http://help.boomi/display/BOD/3+-+Build.

Boomi AtomSphere Building Connectors, Boomi, Inc., May 10, 2010 web.archive.org/web/20100510115902/http://help.boomi/display/BOD/3.2+-+Building+Connectors.

Boomi AtomSphere Building Processes, Boomi, Inc., Dec. 12, 2009 web.archive.org/web/20091212010359/http://help.boomi/display/BOD/3.1+-+Building+Processes.

Boomi AtomSphere Manage, Boomi, Inc., Apr. 30, 2011 web. archive.org/web/20110430060121/http://help.boomi/display/BOD/5+-+Manage.

Boomi AtomSphere Monitoring Atoms, Boomi, Inc.,Nov. 9, 2010 web.archive.org/web/20101109011443/http://help.boomi/display/BOD/5.1+-+Monitoring+Atoms.

Boomi AtomSphere Executing a Process, Boomi, Inc., Nov. 9, 2010 web.archive.org/web/20101109025104/http://help.boomi/display/BOD/5.2+-+Executing+a+Process.

Boomi AtomSphere Viewing Process Executions, Boomi, Inc., Nov. 9, 2010 web.archive.org/web/20101109011449/http://help.boomi/display/BOD/5.3+-+Viewing+Process+Executions.

Boomi AtomSphere Atom Management, Boomi, Inc., May 19, 2011 web.archive.org/web/20110519171500/http://help.boomi/display/BOD/5.4+-+Atom+Management.

Boomi AtomSphere The Boomi Atom, Boomi, Inc., Jun. 13, 2010 web.archive.org/web/20100613115315/http://help.boomi/display/BOD/8+-+The+Boomi+Atom.

SAP Solution Manager: Solution Monitoring—Active Global Support SAP 2005.

(56) References Cited

OTHER PUBLICATIONS

Using Business Activity Monitoring ES Dashboard, Adobe LiveCycle ES Version 8.0 Adobe, Jul. 2007.
IBM FileNet P8, Version 5.0—Help web pages IBM, Nov. 2010.
SAP Solution Manager 3.1: Strategic Background and Functional Overview SAP 2003.
Boomi Integration Platform datasheet Boomi, Inc., 2006.
Boomi On Demand product data sheet Boomi, Inc., 2007.
Boomi AS2 Transport datasheet Boomi, Inc., 2006.
Boomi, Inc., Announces General Availability of the Boomi Integration Platform V3.0, PR Newswire, Jan. 16, 2004.
Dell Agrees to Acquire Software Firm Boomi Wall Street Journal, Nov. 3, 2010.
Silk, Scott, Automating the Balanced Scorecard Management Accounting, vol. 19, No. 11, May 1998.
Arnold, Tom, Dashboard & Scorecard Software Tools for Operations Management and Strategy Deployment Summit Media Partners, Sep. 18, 2002.
Norton, David, SAP Strategic Enterprise Management: Translating Strategy Into Action: The Balanced Scorecard SAP, May 1999.
TIBCO Staffware Process Suite product brochure TIBCO Software Inc., 2006.
Chambers, Bill et al., Real-Time Data Access Using Business Process Management VARBusiness, vol. 19, No. 23, Nov. 10, 2003.
Sturim, Robert, Achieving Competitive Advantage Through Supply Chain Integration Vitria Technology Inc., 1999.
Intalio Adds Celequest BAM Technology to its BPMS Solution; Celequest Management Dashboards Integrated into Intalio/BPMS, Business Wire, Jan. 17, 2006.
Viane, Stijn et al., Corporate Performance Management: Beyond Dashboards and Scorecards Journal of Performance Management, vol. 20, No. 1, 2007.
Ergometrics.com web pages Ergometrics, Mar. 2000, Retrieved from Archive.org Jan. 25, 2007.
iDashes.net web pages iDashes, Inc., May 2001, Retrieved from Archive.org Jan. 25, 2007.
Performance Dashboards: Measuring, Monitoring, and Managing Your Business: Education and Research the Data Warehouse Institute, PowerPoint presentation, 2006.
Eckerson, Wayne E., Performance Dashboards: Measuring, Monitoring, and Managing Your Business: John Wiley & Sons, ISBN 13-978-0-471-724179-9, 2006.
Oracle Internal Controls Manager 11i—Data Sheet, Oracle, Apr. 2003.
Few, Stephen, Intelligent Dashboard Design Perceptual Edge, Sep. 2005.
Resnick, Marc L., Building the Executive Dashboard, Proceedings of the Human Factors and Ergometrics Society, 47th Annual Meeting, 2003.
Evans, Owen B., Billing Score Card, University of Mississippi Medical Center, 2006.
Financial Edge—Dashboard Guide, Blackbaud, Inc., 2011.
Bordeleau, David, Exploring Alternative Predictive Modeling Techniques to Strengthen the Customer Relationship, SAS SUGI31, Data Mining and Predictive Modeling, 2006.
Kareo.com Web pages—Dashboards, Kareo, Jan. 2010, Retrieved from Archive.org, Feb. 19, 2013.
Gonzalez, Tom, Designing Executive Dashboards—Part 1, BrightPoint Consulting, Inc., 2005.
Gonzalez, Tom, Designing Executive Dashboards—Part 2, BrightPoint Consulting, Inc., 2005.

\* cited by examiner

| INTEGRATED DATA KEYWORD | PROCESS COMPONENT ACTION | PROCESS COMPONENT ACTION VALUE | PROCESS PARAMETER | PROCESS PARAMETER VALUE | ORDER NO. |
|---|---|---|---|---|---|
| DATABASE CONNECTOR | DATABASE CONNECTOR | | | | |
| QUERY | | QUERY | | | |
| JOE'S TV | | | HOST NAME | JOE'S TV | |
| PURCHASE ORDER DATABASE | | | DATABASE NAME | PURCHASE ORDERS | |
| POSITION ONE | | | | | 1 |
| USER NAME/ ADMIN1 | | | USER NAME | ADMIN1 | |
| PASSWORD/ PASS | | | PASSWORD | PASS | |

SYSTEM AND METHOD FOR AUTOMATED ON-DEMAND CREATION OF AND EXECUTION OF A CUSTOMIZED DATA INTEGRATION SOFTWARE APPLICATION

FIELD OF THE DISCLOSURE

The present disclosure relates generally to a system and method for deploying and executing hybrid data integration applications via voice commands, and/or an information handling system operating a voice commanded integration application management system to deploy and execute hybrid data integration processes.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, a microphone, a touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which:

FIG. 7 is a graphical diagram illustrating an integrated data keyword/component lookup table according to an embodiment of the present disclosure;

The use of the same reference symbols in different drawings may indicate similar or identical items.

DETAILED DESCRIPTION

Figure 1:
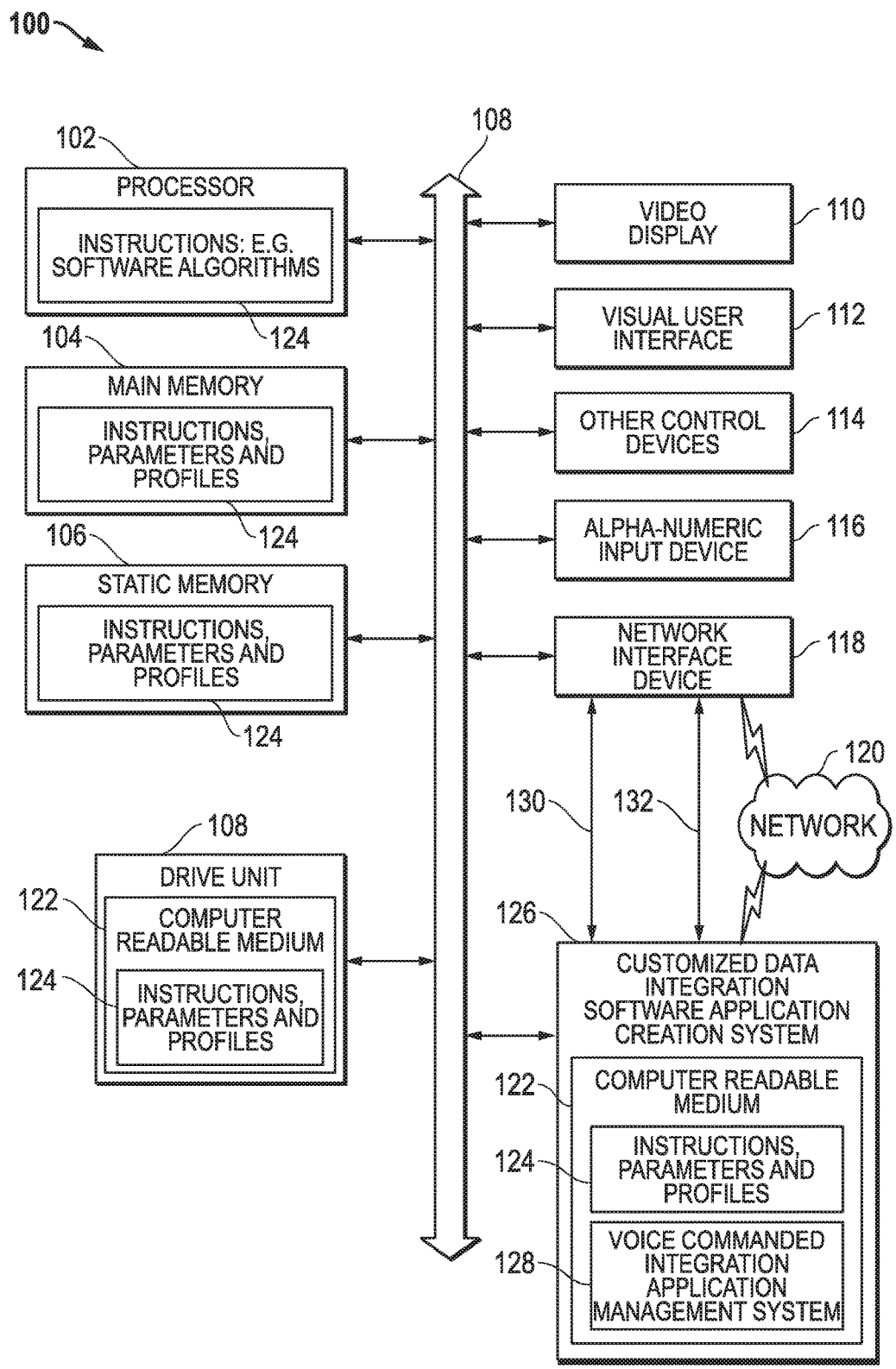
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Conventional software development and distribution models have involved development of an executable software application, and distribution of a computer-readable medium, such as a CD-ROM, or distribution via download of the application from the worldwide web to an end user. Upon receipt of the computer-readable medium or downloaded application, the end user executes installation files stored on the CD-ROM to install the executable software application on the user's personal computer (PC), etc. When the software is initially executed on the user's PC, the application may be further configured/customized to recognize or accept input relating to aspects of the user's PC, network, etc., to provide a software application that is customized for a particular user's computing system. This simple, traditional approach has been used in a variety of contexts, with software for performing a broad range of different functionality. While this model might be satisfactory for individual end users, it is undesirable in sophisticated computing environments.

Today, most corporations or other enterprises have sophisticated computing systems that are used both for internal operations, and for communicating outside the enterprise's network. Much of present day information exchange is conducted electronically, via communications networks, both internally to the enterprise, and among enterprises. Accordingly, it is often desirable or necessary to exchange information/data between distinctly different computing systems, computer networks, software applications, etc. The enabling of communications between diverse systems/networks/applications in connection with the conducting of business processes is often referred to as "business process integration." In the business process integration context, there is a significant need to communicate between different software applications/systems within a single computing network, e.g. between an enterprise's information warehouse management system and the same enterprise's SAP purchase order processing system. There is also a significant need to communicate between different software applications/systems within different computing networks, e.g. between a buyer's purchase order processing system, and a seller's invoicing system.

Relatively recently, systems have been established to enable exchange of data via the Internet, e.g. via web-based interfaces for business-to-business and business-to-consumer transactions. For example, a buyer may operate a PC to connect to a seller's website to provide manual data input to a web interface of the seller's computing system, or in higher volume environments, a buyer may use an executable software application known as EDI Software, or Business-to-Business Integration Software to connect to the seller's computing system and to deliver electronically a business "document," such as a purchase order, without requiring human intervention to manually enter the data. Such software applications are readily available in the market today. These applications are typically purchased from software vendors and installed on a computerized system owned and maintained by the business, in this example the buyer. The seller will have a similar/complementary software application on its system, so that the information exchange may be completely automated in both directions. In contrast to the present disclosure, these applications are purchased, installed and operated on the user's local system. Thus, the user typically owns and maintains its own copy of the system, and configures the application locally to connect with its trading partners.

In both the traditional and more recent approaches, the executable software application is universal or "generic" as to all trading partners before it is received and installed within a specific enterprise's computing network. In other words, it is delivered to different users/systems in identical, generic form. The software application is then installed within a specific enterprise's computing network (which may include data centers, etc. physically located outside of an enterprises' physical boundaries). After the generic application is installed, it is then configured and customized for a specific trading partner after which it is ready for execution to exchange data between the specific trading partner and the enterprise. For example, Walmart may provide on its website specifications of how electronic data such as Purchase Orders and Invoices must be formatted for electronic data communication with Walmart, and how that data should be communicated with Walmart. A supplier/enterprise is then responsible for finding a generic, commercially-available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

Recently, systems and software applications have been established to provide a system and method for on-demand creation of customized software applications in which the customization occurs outside of an enterprise's computing network. These software applications are customized for a specific enterprise before they arrive within the enterprise's computing network, and are delivered to the destination network in customized form. The Dell Boomi® Application is an example of one such software application. With Dell Boomi® and other similar applications, an employee within an enterprise can connect to a website using a specially configured graphical user interface to visually model an "integration process" via a flowcharting process, using only a web browser interface. During such a modeling process, the user would select from a predetermined set of process-representing visual elements that are stored on a remote server, such as the web server. By way of an example, the integration process could enable a bi-directional exchange of data between its internal applications, between its internal applications and its external trading partners, or between internal application and applications running external to the enterprise. Applications running external to the enterprise are commonly referred to as SaaS "Software as a Service."

A customized data integration software application creation system in an embodiment may allow a user to create a customized data integration software application by modeling a data integration process flow using a visual user interface. A user may model the process flow by adding visual elements representing integration process components which are associated with codesets incorporating machine-readable, executable code instructions for execution by a run-time engine. Each process component may be associated with an integration process action to be taken on incoming data. Each process component may further be associated with process component parameters detailing specific aspects of the process action to be taken. For example, a process component may instruct the run-time engine to take the action of querying a database, and the process component parameters may provide the name, location, user name, and required password for achieving the action of querying the database. Each process component parameter in an embodiment may be associated with a data profile codeset.

If a process component having process component parameters specific to one of a user's known trading partners, the user may wish to reuse the same process component (which has already been tailored for use with a specific known trading partner) in other data integration process flows. In such a scenario, a user may save the process component already tailored for use with a specific known trading partner as a trading partner component, which the customized data integration software application creation system may associate with a trading partner codeset.

A customized data integration software in an embodiment may include a run-time engine for execution of one or more codesets, a connector codeset comprising data required for electronic communication in accordance with a specific application programming interface (API), a trading partner code set comprising data required for electronic communication with a specific trading partner's system, and/or a data profile codeset associated with a user-specified process component parameter. The dynamic runtime engine, when initiated, in an embodiment, may download all connector codesets, trading partner codesets, and data profile codesets associated with it, and execute those code instructions to perform the integration process modeled by the visual flowchart generated by the user.

As changes are made to this model, via the website, or to the code that executes the model, the executable software application may automatically check for and apply these changes as needed without requiring human intervention. Each visually modeled integration process represents a complete end-to-end interface. For example, a process could be modeled to accept a purchase order (PO) from a retailer such as Walmart, transform the PO into a format recognizable by a certain internal order management software application of the enterprise, and then insert the contents of that PO directly into the enterprise's order management system.

Much of present day information exchange is conducted via input devices other than a traditional keyboard, mouse, and video display like that required to use existing systems for on-demand creation of customized data integration software applications such as the Dell Boomi® visual user interface (e.g. website) and other similar applications via the world wide web. Given the rise of use of portable devices, tablets, and smart phones there now exists a need to interface with integration applications like Dell Boomi® and other similar applications via voice command. The present disclosure describes a system and method for deploying and executing hybrid data integration applications via voice commands, and/or an information handling system operating a voice commanded integration application management system to deploy and execute hybrid data integration processes. Such an information handling system or method may allow users to interface with integration applications like Dell Boomi® and other similar applications via voice command. The term "hybrid," as it is used in the context of this disclosure refers to systems that may be cloud accessible and/or on-premise accessible.

Software applications may be used to design customized data integration software applications, outside of an enterprise's computing network, for integration of data between disparate sources. These software applications may combine generic integration application templates with integration process data profile codesets associated with received user input in order to customize the generic integration application templates, creating connector codesets for use with a specific API or trading partner. In such a way, the code instructions of a customized data integration software application may be customized before they arrive within the enterprise's computing network.

With these software applications, an employee within an enterprise may use a specially configured graphical user interface to visually model an "integration process" via a flowcharting process, using only a web browser interface. In doing so, the user may combine one or more visual elements representing parts of an integration process into a visual flowchart shown on the visual user interface. The user may also affect these visual elements by adding user input within the visual user interface. Each visual element represented within the integration process visual flowchart may be associated with a generic, pre-written set of code in the form of an XML file called an integration application template. The integration application templates may also include markers indicating where further code associated with the user input may be invoked from within the integration application template in order to customize it. Each user input variable may be associated with a data profile codeset XML file, which may be invoked from within the integration application template at the marker location.

A customized data integration software application creation system in an embodiment may allow a user to create a customized data integration software application by modeling a data integration process flow using a visual user interface. A user may model the process flow by adding visual elements representing integration process components which are associated with codesets incorporating machine-readable, executable code instructions for execution by a run-time engine. Each process component may be associated with an integration process action to be taken on incoming data. Each process component may further be associated with process component parameters detailing specific aspects of the process action to be taken. For example, a process component may instruct the run-time engine to take the action of querying a database, and the process component parameters may provide the name, location, user name, and required password for achieving the action of querying the database. Each process component parameter in an embodiment may be associated with a data profile codeset.

If a process component having process component parameters specific to one of a user's known trading partners, the user may wish to reuse the same process component (which has already been tailored for use with a specific known trading partner) in other data integration process flows. In such a scenario, a user may save the process component already tailored for use with a specific known trading partner as a trading partner component, which the customized data integration software application creation system may associate with a trading partner codeset.

A customized data integration software in an embodiment may include a run-time engine for execution of one or more codesets, a connector codeset comprising data required for electronic communication in accordance with a specific application programming interface (API), a trading partner code set comprising data required for electronic communication with a specific trading partner's system, and/or a data profile codeset associated with a user-specified process component parameter. The dynamic runtime engine, when initiated, in an embodiment, may download all connector codesets, trading partner codesets, and data profile codesets associated with it, and execute those code instructions to perform the integration process modeled by the visual flowchart generated by the user.

Because much of present day information exchange is conducted via input devices other than a traditional keyboard, mouse, and video display like that required to use applications via the world wide web, a need exists to interface with such applications via voice command. This may expand availability and access to customized data integration software or for creation of customized data integration software applications according to embodiments described herein. Further, expanded availability and access may be provided for execution of data integration processes for transforming data to enable electronic exchange between disparate data formats as described in embodiments herein. Voice commanded hybrid integration solutions such as customized data integration software applications may be created or executed in situations where limited accessibility circumstances exist, such as for the vision impaired. Voice commanded hybrid integration solutions may also be used in constrained or adverse operating environments such as where there are space constraints or users are wearing gloves or otherwise occupied. Voice commanded hybrid integration solutions may further be implemented simply for convenience or for accessibility despite lack of skill or familiarity with the hybrid integration solution systems.

In the present disclosure, a system and method for deploying and executing hybrid data integration applications via voice commands, and/or an information handling system operating a voice commanded integration application management system to deploy and execute hybrid data integration processes are described. Such a system, method, or information handling system may allow users to interface with systems for creation of a customized data integration software application like Dell Boomi® and other similar data integration creation applications via voice command.

In the present disclosure, a voice commanded integration application management system is established to allow a user to create a new customized data integration software application, execute a new or established customized data integration software application, and to obtain the output result of a new or existing customized data integration software application via voice output. In one example embodiment, a voice recognition software system may receive a voice command from a user requesting information relating to a value of an integrated data element that is output from a customized data integration software application. The voice recognition software system in such an embodiment may associate the voice command with one or more integrated data keywords within a known integrated data keyword library, and transmit the one or more integrated data keywords to the voice commanded integration application management system. The voice commanded integration application management system may then determine whether an existing customized software integration application may be capable of providing the requested output by determining whether a single, established customized software integration application associated with each of the integrated data keywords exists. If such a single, established customized software integration application exists, the voice commanded integration application management system may instruct the run-time engine associated with that established customized software integration application to execute the established customized software integration application. If no such single, established customized software integration application exists, the voice commanded integration application management system may communicate the lack of such an application, and a request for the user to choose whether to create a new customized software integration application capable of providing the requested output to the voice recognition software system, which may relay those communications to the user via voice command.

In another embodiment, the run-time engine may execute either a new or established customized software integration application, receive the value of the output integrated data resulting from the customized software integration application, and transmit that value to the voice commanded integration application management system. The voice commanded integration application management system may then transmit that value to the voice recognition software system which may generate a digital audio file verbalizing the received value of the integrated data field, and play the digital audio file to the end user via a speaker. In such a way, a user may request via voice a value of an output resulting from a customized software integration application, and receive that output value via voice, with no need for the user to access a visual user interface.

In another embodiment, the voice commanded integration application management system may incorporate user input given in the form of voice commands or other input such as via keyboard (e.g. user name and password) into an existing customized software integration application prior to execution of the application. In such an embodiment, the voice recognition system may receive a user request to access an established customized software integration application, associate that request with a first integrated data keyword, and transmit that first integrated data keyword to the voice commanded integration application management system. The voice commanded integration application management system may then associate the first integrated data keyword with an established customized software integration application, and determine whether that established customized software integration application requires user input such as user authorization. For example, the voice commanded integration application management system may determine the established customized software integration application requires the user to provide a user name and password.

If the voice commanded integration application management system determines the established customized software integration application does not require further user input, the voice commanded integration application management system may release the established customized software integration application for download by the run-time engine. However, if the voice commanded integration application management system determines the established customized software integration application does require further user input, the voice commanded integration application management system may transmit a code instruction to the voice recognition system requesting the user to provide input, receive a second integrated data keyword in response to that request, associate the responsive second integrated data keyword with a data profile codeset representing a process component parameter and value, configure the established customized software integration application to be executable with the data profile codeset, and release the established customized software integration application for download by the run-time engine.

In another embodiment, a voice commanded integration application management system may allow the user to generate a new customized software integration application using only voice command. In such an embodiment, the voice commanded integration application management system may receive a machine-readable, executable code instruction from the voice recognition software system to create a new customized software integration application.

The voice commanded integration application management system may then prompt the user to select a process component corresponding to a visual element by transmitting a machine-readable, executable code instruction to the voice recognition software system to play an audio file with such a prompt. The voice commanded integration application management system may then receive a first integrated data keyword from the voice recognition software system associated with the user's response to that prompt, and may associate the first integrated data keyword with a connector codeset represented by a process component.

The voice commanded integration application management system in such an embodiment may then determine whether the user-chosen process component requires further user input. If the voice commanded integration application management system determines the chosen process component does not require further user input, the voice commanded integration application management system may then determine whether the user wishes to add a second process component representing a second visual element to the integration process modeled by the visual elements. In such a case, the voice commanded integration application management system may send a machine-readable, executable code instruction to the voice recognition system to play an audio file prompting the user to choose whether to add another process component. Alternatively, if the voice commanded integration application management system determines the first process component does require further user input, the voice commanded integration application management system may send a machine-readable, executable code instruction to the voice recognition software system to play an audio file prompting the user to provide the required user input, receive a second integrated data keyword associated with the user response to that prompt, and associate the second integrated data keyword with a data profile codeset represented by a process component parameter value.

The voice commanded integration application management system in such an embodiment may then send a machine-readable, executable code instruction to the voice recognition system to play an audio file prompting the user to choose whether to add another process component. If the user chooses to add another process component, the voice commanded integration application management system may return to the step of prompting the user to select a process component corresponding to a visual element. If the user does not choose to add another process component, the voice commanded integration application management system may generate a run-time engine for execution of the new customized software integration application, and for transmission of values associated with requested data fields located in an integrated data file or integrated database, and transmit the run-time engine to the user system.

In another example embodiment, the voice commanded integration application management system may receive a request from the run-time engine to download the user system an established customized software integration application codeset, one or more trading partner codesets, one or more connector codesets, and/or one or more data profile codesets associated with the run-time engine. The voice commanded integration application management system may then determine whether the established customized software integration application codeset, one or more trading partner codesets, one or more connector codesets, and/or one or more data profile codesets associated with the run-time engine have been previously transmitted to the user system. If the codesets have not already been transmitted to the user system, the voice commanded integration application management system may transmit the established customized software integration application codeset, one or more trading partner codesets, one or more connector codesets, and/or one or more data profile codesets associated with the run-time engine to the user system, then execute the new or existing customized data integration application at the user system.

In another example embodiment, the voice recognition software system may receive a voice command and transmit an integrated data keyword associated with that voice command to the voice commanded integration application management system. In such an embodiment, the voice recognition software system may generate an analog recording of a voice command received from a user via a microphone, convert the analog recording of the voice command to a digital recording, and parse the digital recording into a plurality of segments. The voice recognition system in such an embodiment may then associate each segment with a known phoneme stored in a library of known phonemes, and use a statistical modeling system to associate the plurality of phonemes with an integrated data keyword or a machine-readable, executable code instruction. Finally, the voice recognition system in such an embodiment may transmit the integrated data keyword or machine-readable, executable code instruction to the voice commanded integration application management system.

In yet another example embodiment, the voice recognition software system may play a digital audio file to a user via a speaker communicating an output value of an executed customized software integration application. In such an embodiment, the voice recognition software system may receive an instruction from the voice commanded integration application management system to communicate a data element value which was output from an executed customized software integration application to the user in voice format. The voice recognition software system in such an embodiment may associate the data element value with a plurality of phonemes in a known phoneme library, associate each of the plurality of phonemes with a segment of a digital audio file, combine all segments of the digital audio files into a single digital audio file of a recording of an artificial voice speaking the value of the data element in voice format, and play the digital audio file to the user via a speaker.

In one embodiment, the voice commanded integration application management system is software code executable on one or more application processors, which may function within a customized data integration software application creation system, residing at a service provider system/server. In other embodiments, some or all of the voice commanded integration application management system may include firmware executed via processors or a controller or may be hardcoded as an applied specific integrated circuit (ASIC) or other circuit to execute some or all of the operations described in the disclosure herein.

Examples are set forth below with respect to particular aspects of an information handling system for associating user given voice commands with integration processes or user input required to execute integration processes to create a customized data integration software application.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, a microphone, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules described above, and operates to perform one or more of the methods described above. The information handling system 100 may execute code 124 for customized data integration software application creation system, and/or code 128 for a voice commanded integration application management system that may operate on servers or systems, remote data centers, or on-box in individual client information handling systems such as a local display device, or a remote display device, according to various embodiments herein. In some embodiments, it is understood any or all portions of code 124 for a customized data integration software application creation system, and/or code 128 for a voice commanded integration application management system may operate on a plurality of information handling systems 100.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, drive unit 110, or the computer readable medium 122 of the customized data integration software application creation system 126 (volatile (e.g. random-access memory, etc.), nonvolatile (read-only memory, flash memory etc.) or any combination thereof). Additional components of the information handling system can include one or more storage devices such as static memory 106, drive unit 110, and the computer readable medium 122 of customized data integration software application creation system 126. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a base video display unit 110, such as a liquid crystal display (LCD), an organic light emitting diode (OLED), a flat panel display, a solid state display, or other display device. Additionally, the information handling system 100 may include an alpha numeric control device 118, such as a keyboard, and another control device 114, such as a mouse, touchpad, fingerprint scanner, retinal scanner, face recognition device, voice recognition device, or gesture or touch screen input.

The information handling system 100 may further include a visual user interface 112. The visual user interface 112 in an embodiment may provide a visual designer environment permitting a user to define process flows between applications/systems, such as between trading partner and enterprise systems, and to model a customized business integration process. The visual user interface 112 in an embodiment may provide a menu of pre-defined user-selectable visual elements and permit the user to arrange them as appropriate to model a process, as described in greater detail below with reference to FIG. 3 and may be displayed on visual display 110. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc. Information and computer executable instructions for presenting such a graphical user interface 112 are stored in a memory of the customized data integration software application creation system 126.

Further, the graphical user interface 112 allows the user to provide user input providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc, and dialog boxes permitting textual entries by the user, such as to describe the format and layout of a particular data set to be sent or received, for example, a Purchase Order. The providing of this input by the user results in the system's receipt of such user-provided information as an integration process data profile codeset.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 and 128 that can be executed to cause the computer system to perform any one or more of the methods or computer based functions disclosed herein. For example, information handling system 100 includes one or more application programs 124 and 128, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 110, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 110 or in a storage system (not illustrated) associated with network interface device 112 or any combination thereof. Application programs 124 and 128, and BIOS/FW code 124 can each be implemented as single programs, or as separate programs carrying out the various features as described herein. Application program interfaces (APIs) such Win 32 API may enable application programs 124, and 128 to interact or integrate operations with one another.

In an example of the present disclosure, instructions 124 may execute customized data integration software application or software for creating the same, and the voice commanded integration application management system 128 as disclosed herein, and an API may enable interaction between the application program and device drivers and other aspects of the information handling system and software instructions 124 thereon. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 110, and the customized data integration software application creation system 126 may include a computer-readable medium 122 such as a magnetic disk in an example embodiment. The computer-readable medium of the memory, storage devices and customized data integration software application creation system 104, 106, 110, and 126 may store one or more sets of instructions 124, and/or 128 such as software code corresponding to the present disclosure.

The disk drive unit 110, static memory 106, and computer readable medium 122 of the customized data integration software application creation system 126 also contains space for data storage such as an information handling system for deploying and executing hybrid data integration applications via voice commands. Data including but not limited to a integrated data keyword correlation table, a integrated data keyword/component correlation table, an application process component lookup table, a library of known integrated data keywords, a connector codeset, a trading partner codeset, a data profile codeset, a run-time engine, a library of known phonemes, and/or a statistical modeling computer program application for associating a plurality of known phonemes with a computer-readable executable code instruction or an integrated data keyword may also be stored in part or in full in the disk drive unit 110, static memory 106, or computer readable medium 122 of the customized data integration software application creation system 126. Further, the instructions 124, or the voice commanded integration application management system 128 may embody one or more of the methods or logic as described herein.

In a particular embodiment, the instructions, parameters, and profiles 124, and voice commanded integration application management system 128 may reside completely, or at least partially, within the main memory 104, the static memory 106, disk drive 110, customized data integration software application creation system 126, and/or within the processor 102 during execution by the information handling system 100. Software applications may be stored in static memory 106, disk drive 110, or the customized data integration software application creation system 126.

Network interface device 118 represents a NIC disposed within information handling system 100, on a main circuit board of the information handling system, integrated onto another component such as processor 102, in another suitable location, or a combination thereof. Network interface device 118 includes network channels 130 and 132 that provide interfaces to devices that are external to information handling system 100. In a particular embodiment, network channels 130 and 132 are of a different type than memory bus 108 and network interface device 118 translates information from a format suitable to the memory bus 108 to a format suitable to external devices. An example of network channels 130 and 132 includes InfiniBand channels, Fibre Channel channels, Gigabit Ethernet channels, proprietary channel architectures, or a combination thereof. The network interface device 118 can include another information handling system, a data storage system, another network, a grid management system, another suitable resource, or a combination thereof.

Network channels 130 and 132 can be connected to external network resources, and may be connected directly to the customized data integration software application creation system 126, or indirectly through network interface device 118 to the customized data integration software application creation system 126 that may be remote from the information handling system 100. The customized data integration application creation system 126 may also contain computer readable medium 122. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include a voice commanded integration application management system 128, as a part of the customized data integration software application creation system 126. Both the voice commanded integration application management system 128 and the customized data integration software application creation system 126 may be operably connected to the bus 108, may connect to the bus indirectly through the network 120 and the network interface device 118, or may connect directly to the network interface device 118 via the network channels 130 and 132. The voice commanded integration application management system 128 and the customized data integration software application creation system 126 are discussed in greater detail herein below.

The information handling system 100 may also include a voice recognition software system (not shown), which may be operably connected to the bus 108, may connect to the bus indirectly through the network 120 and the network interface device 118, or may connect to the voice commanded integration application management system 128 via the network 120 and the network interface device 118. The voice recognition software system is discussed in greater detail herein below.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, or module can include software, including firmware embedded at a device, such as a Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the customized data integration software application creation system 126, the voice commanded integration application management system 128 above and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
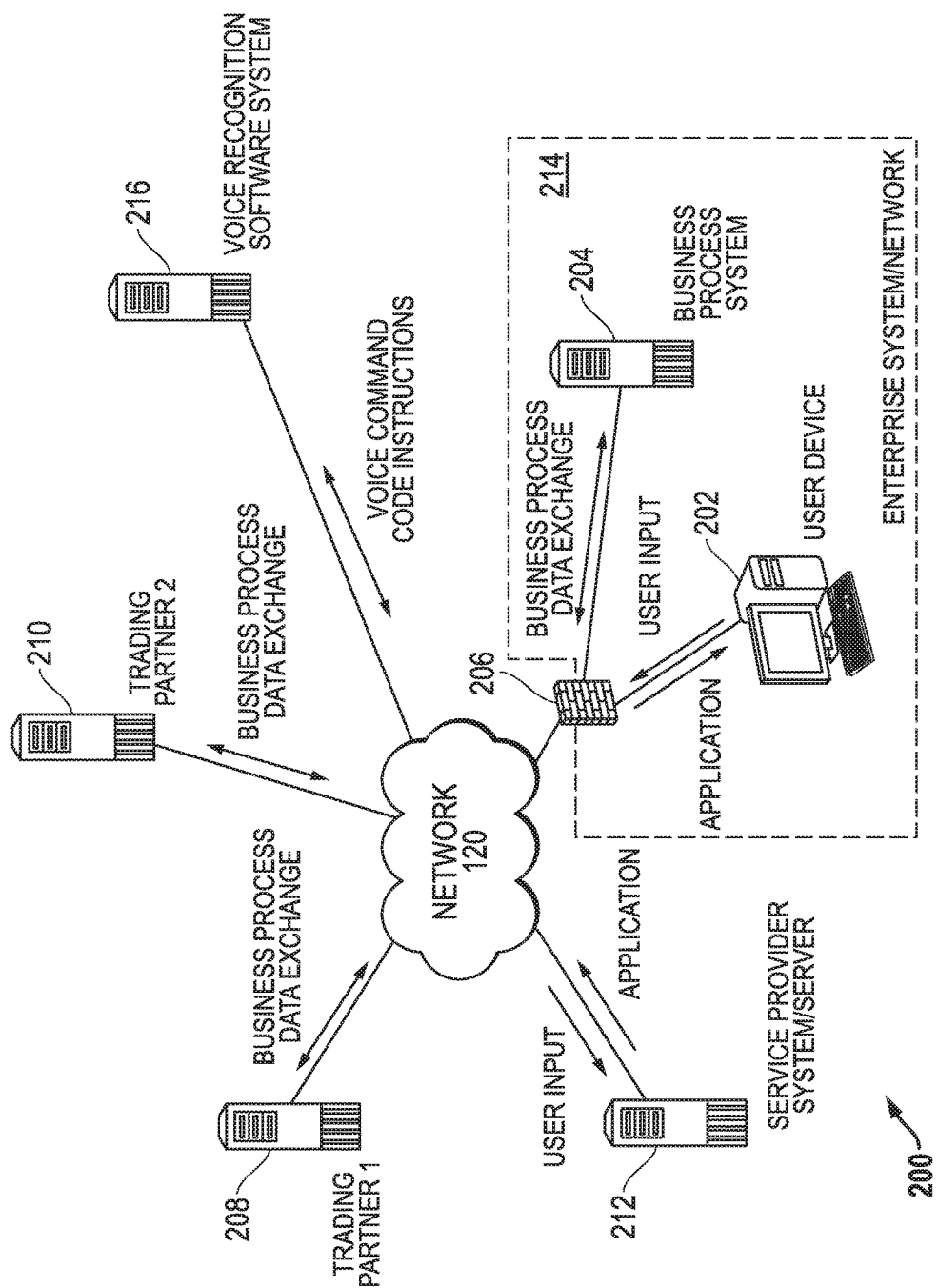
FIG. 2 is a block diagram illustrating a simplified integration network in an embodiment according to the present disclosure.

FIG. 2 is a block diagram illustrating a simplified integration network in an embodiment according to the present disclosure. Actual integration network topology could be more complex in some other embodiments. As shown in FIG. 2, an embodiment may include conventional computing hardware of a type typically found in client/server computing environments. More specifically, the integration network 200 in an embodiment may include a conventional user/client device 202, such as a conventional desktop PC, enabling a user to communicate via the network 120, such as the Internet. In another aspect of an embodiment, the user device 202 may include a portable computing device, such as a computing tablet, or a smart phone. The user device 202 in an embodiment may be configured with conventional web browser software, such as Google Chrome®, Firefox®, or Microsoft Corporation's Internet Explorer® for interacting with websites via the network 120. In an embodiment, the user device 202 may be positioned within an enterprise network 214 behind the enterprise network's firewall 206, which may be of a conventional type. As a further aspect of an embodiment, the enterprise network 214 may include a business process system 204, which may include conventional computer hardware and commercially available business process software such as QuickBooks, Salesforce SAP's SAP ERP, Oracle's OneWorld JD Edward ERP, Infor's WMS Application, or many other types of databases.

In an embodiment, the integration network 200 may further include conventional hardware and software providing trading partners 208 and 210 for receiving and/or transmitting data relating to business-to-business transactions. It is contemplated such systems are conventional and well-known. For example, Walmart may operate trading partner system 208 to allow for issuance of purchase orders to suppliers, such as the enterprise 214, and to receive invoices from suppliers, such as the enterprise 214, in electronic data form as part of electronic data exchange processes of a type well known, including, but not limited to via the world wide web, and via FTP or SFTP.

In an embodiment, a provider of a service ("service provider") for creating on-demand, real-time creation of customized data integration software applications may operate a service provider server/system 212 within the integration network 200. The service provider system/server 212 may be specially configured in an embodiment, and may be capable of communicating with devices in the enterprise network 214. The service provider system/server 212 in an embodiment may be specially configured to store certain pre-defined, i.e. pre-built, datasets in its memory. Such data may include a pre-defined container (also referred to herein as a "dynamic runtime engine") installation program that is executable at the enterprise system 214, or at a third party server (not shown) located remotely from both the service provider system/server 212 and the enterprise system 214.

The runtime engine may operate to download machine-readable, executable code instructions from the service provider server/system 212 in the form of codesets, which may include pre-built software code stored on the service provider system/server 212 such as connector codesets, trading partner codesets, and/or data profile codesets. The runtime engine may further operate to execute those codesets in order to perform an integration process, providing for exchange of business integration data between the enterprise's business process system 204 and user device 202 within the enterprise network 204, and/or between the enterprise network 214 and trading partners 208 and 210, and/or between the enterprise's internal computing system 204 and the enterprise's computing systems external to the enterprise network 214, commonly referred to as SaaS (Software as a Service). For example, the application template in an embodiment may be constructed as an integration of customer data between Salesforce.com and SAP using java programming technology.

A connector codeset in an embodiment may correspond to a modeled integration process component, but may not itself be configured for use with any particular enterprise, or any particular trading partner. Accordingly, the connector codeset may not yet be ready for execution to provide business integration functionality for any particular trading partner or enterprise until the connector codeset is configured to be executable with additional code and/or data in the form of one or more integration data profile codesets incorporating user-specific information or trading partner specific information. Thus, the connector codeset in an embodiment may be used by different enterprises or customers of the service provider 212. By configuring a connector codeset to be executable with a data profile codeset incorporating tranding partner specific information, a user may instruct the creation of a trading partner codeset.

The dynamic runtime engine may download to its location pre-built connector codesets, trading partner codesets, and/or data profile codesets from the service provider system/server 212, and execute the pre-built connector codesets, trading partner codesets, and/or data profile codesets according to a visual flowchart residing at the service provider server/system 212 and modeled by the user using a provided visual graphical user interface and/or using voice commands.

In an embodiment, a voice recognition application for receiving user voice commands and associating those voice commands with machine-readable, executable voice command code instructions may operate a voice recognition software system 216 within the integration network 200. A voice recognition software system 216 in an embodiment may use a natural language user interface to answer questions, respond to questions, and perform actions by delegating requests to a set of web services, including a service provider server/system operating a customized data integration software application creation system. Examples of such voice recognition software systems 216 include, but are not limited to Microsoft's Cortana®, Google's Google Now®, Amazon's Alexa®, Samsung's S Voice®, Dragon Naturally-Speaking®, Apple's Siri®, IBM's Watson®, and Facebook's M® among others.

The voice recognition system 216 may operate to generate analog recordings of a user's spoken input, convert the analog recording to a digital signal, process the digital signal, associate the digital signal with a plurality of known phonemes, use a statistical modeling method to associate the plurality of phonemes with either text statements or computer readable executable code instructions, to associate text statements with one or more integrated data keywords, and/or to transmit the machine-readable, executable code instructions and/or integrated data keywords to the service provider server/system 212. The voice recognition system 216 may also operate to receive a machine-readable, executable code instruction and/or integrated data keyword from the service provider server/system 212, associate the integrated data keyword with a plurality of known phonemes, associate each identified phoneme with a digital recording of an artificial voice speaking the phoneme, concatenate all digital recordings of an artificial voice speaking the plurality of known phonemes into a single digital recording of an artificial voice speaking the integrated data keyword, and playing the single digital recording to the user via a microphone, in order to provide voice output of an integrated data process performed by the run-time engine. The voice recognition system 216 include a computer readable medium for storage of an integrated data keyword library, a library of known phonemes, one or more digital recordings, one or more analog recordings, and/or a statistical modeling computer application program for associating one or more known phonemes with a computer readable, executable code instructions, an integrated data keyword, or a digital recording of an artificial voice speaking the one or more known phonemes.

Figure 3:
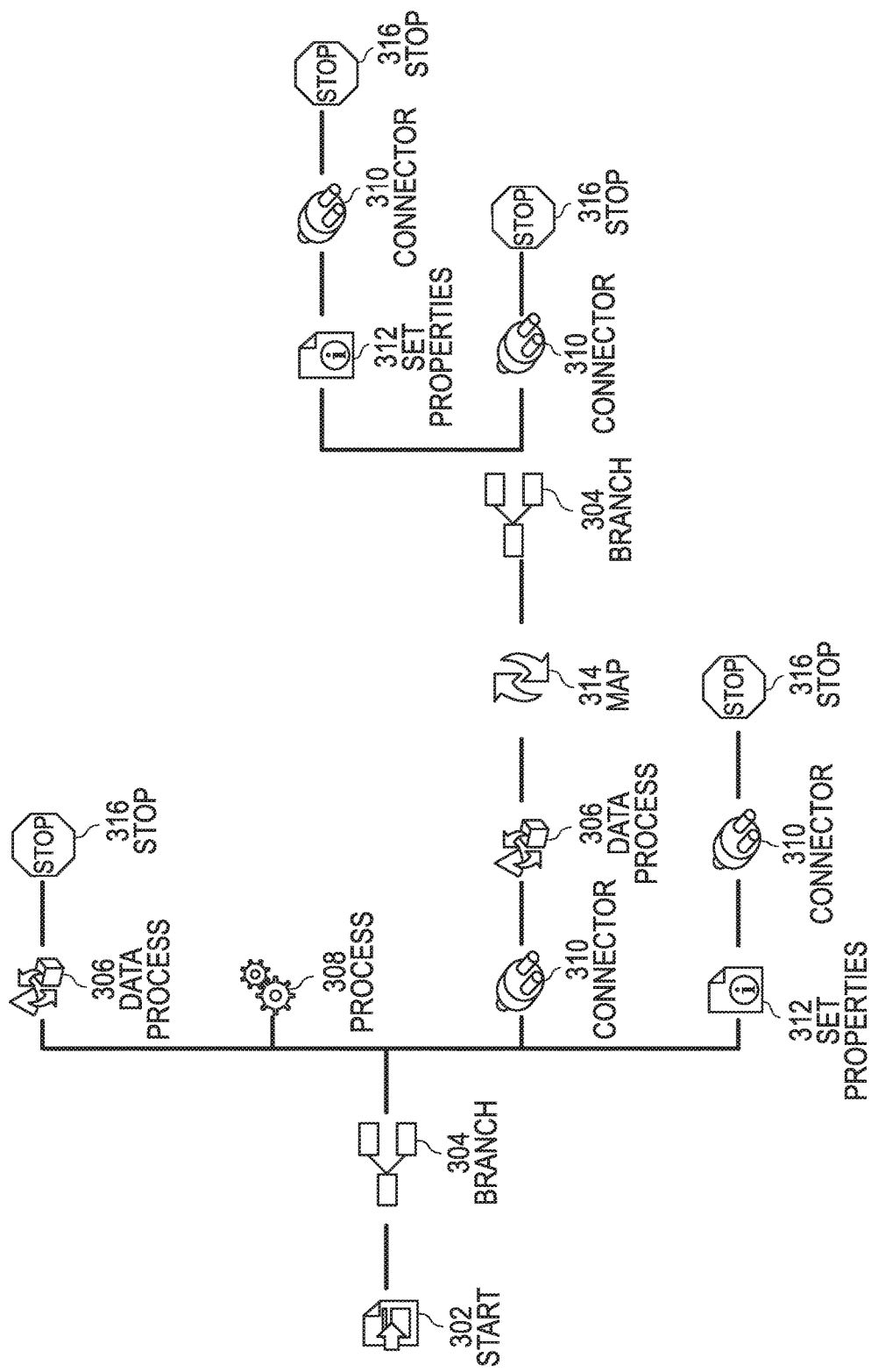
FIG. 3 is a block diagram illustrating a user-generated flow diagram of an integration process according to an embodiment of the present disclosure.

FIG. 3 is a block diagram illustrating a user-generated flow diagram of an integration process according to an embodiment of the present disclosure. A user may generate a flow diagram in an embodiment by providing a chronology of process-representing visual elements via the use of a visual user interface. As discussed above, the visual user interface in an embodiment may provide a visual designer environment permitting a user to define process flows between applications/systems, such as between trading partner and enterprise systems, and to model a customized business integration process. The visual user interface in an embodiment may provide a menu of pre-defined user-selectable visual elements and permit the user to arrange them as appropriate to model a process. The elements may include visual, drag-and-drop icons representing specific units of work (known as process components) required as part of the integration process, such as invoking an application-specific connector, transforming data from one format to another, routing data down multiple paths of execution by examining the contents of the data, business logic validation of the data being processed, etc. Information and computer executable instructions for presenting such a graphical user interface are stored in a memory of the customized data integration software application creation system in the form of connector codesets, trading partner codesets, and/or data profile codesets.

Each process component may be identifiable by a process component type, and may further include an action to be taken. For example, a process component may be identified as a "connector" component. Each "connector" component, when chosen and added to the process flow in the visual user interface, may provide a drop down menu of different actions the "connector" component may be capable of taking on the data as it enters that process step. The action the user chooses from the drop down menu may be associated with a process component action value, which also may be associated with a connector codeset. Further, the graphical user interface in an embodiment may allow the user to define the parameters of process components by providing user input, which the customized data integration software application creation system may correlate with a data profile codeset, also stored in a memory of the customized data integration software application creation system.

In an embodiment, a user may choose a process component it uses often when interfacing with a specific trade partner, and define the parameters of that process component by providing parameter values specific to that trading partner. If the user wishes to use this process component, tailored for use with that specific trading partner repeatedly, the user may save that tailored process component as a trading partner component, which will be associated with a trading partner codeset. For example, if the user often accesses the Walmart purchase orders database, the user may create a database connector process component, associated with a pre-built connector codeset that may be used with any database, then tailor the database connector process component to access the specific purchase order database owned and operated by Walmart by adding process component parameters associated with one or more data profile codesets. If the user uses this process component in several different integration processes, the user may wish to save this process component for later use by saving it as a trading partner component, which will be associated with a trading partner codeset. In the future, if the user wishes to use this component, the user may simply select the trading partner component, rather than repeating the process of tailoring a generic database connector process component with the specific parameters defined above.

The visual elements in an embodiment may indicate that the user wishes to perform a specific process upon a set of data, that specific process correlating to one or more connector codesets, trading partner codesets, and/or data profile codesets. Each of these codesets may be a pre-defined subset of code instructions stored at the system provider server/system in an XML format. The system provider server/system in an embodiment may generate a dynamic runtime engine for executing these pre-defined subsets of code instructions correlated to each individual process-representing visual element (process component) in a given flow chart in the order in which they are modeled in the given flow chart. The customized data integration software integration application in an embodiment is the set of code instructions represented by the process reflected in the flow chart created by the user (connector codesets or trading partner codesets), along with sets of code instructions correlating to received user input (data profile codesets), and along with the dynamic runtime engine that executes these sets of code instructions.

As shown in FIG. 3, such process-representing visual elements may include, but may not be limited to a start element 302, a branch element 304, a data process element 306, a process call element 308, a connector element 310, a set properties element 312, a map element 314, and a stop element 316. Although each of these process-representing visual elements may correspond to a connector codeset, they may not be configured for use with any particular enterprise or trading partner until further data attributes unique to the specific integration process are provided by the user in the form of user input associated with one or more integration process data profile codesets. Once the service provider server/system has received the user-generated flow diagram of the integration process and any necessary further user input in the form of data attributes unique to the specific integration process, the service provider server/system may generate a dynamic runtime engine, which is an executable software application capable of running on a computer within the enterprise's network available to the user of the website for download and installation within the enterprise network or at a third party server located remotely from both the service provider server/system and the enterprise network. When initiated, the dynamic runtime engine may connect to the service provider system/server, automatically download the XML connector codesets, trading partner codesets, and/or data profile codeset(s), and execute them according to the flowchart generated by the user to model the requested integration process.

In an embodiment, a start element 302 may operate to begin a process flow, and a stop element 316 may operate to end a process flow. As discussed above, each visual element may require user input in order for a particular enterprise or trading partner to use the resulting process. The start element 302 in an embodiment may further allow or require the user to provide data attributes unique to the user's specific integration process, including, but not limited to the source of incoming data to be integrated.

In an embodiment, a branch element 304 may operate to allow simultaneous processes to occur within a single dynamic runtime engine installation program. The branch element 304 in an embodiment may further allow or require the user to provide data attributes unique to the user's specific integration process, including, but not limited to the number of processes the user wishes to run simultaneously within a single dynamic runtime engine installation program.

In an embodiment, a data process element 306 may operate to manipulate document data within a process. The data process element 306 in an embodiment may further allow or require the user to provide data attributes unique to the user's specific integration process, including, but not limited to searching and replacing text, choosing to zip or unzip data, choosing to combine documents, choosing to split documents, or choosing to encode or decode data. For example, in an embodiment, a data process element may require the user to provide data attributes unique to the user's specific integration process, such as choosing a specific encryption type.

In an embodiment, a process element 308 may operate to execute another process from within a process (i.e. execute a subprocess). The process element 308 in an embodiment may further allow or require the user to provide data attributes unique to the user's specific integration process, including, but not limited to the name of the process the user wishes to become a subprocess of the process within the flow diagram.

In an embodiment, a connector element 310 may operate to enable communication with various applications or data sources between which the user wishes to exchange data. The connector element 310 in an embodiment may further allow or require the user to provide data attributes unique to the user's specific integration process, including, but not limited to the source of the data, and the operation the user wishes to perform on the data. For example, in an embodiment, the source of the data may be Salesforce.com, and the operation may include getting, sending, creating, deleting, updating, querying, filtering, or sorting of the data associated with a specific Salesforce.com account. For example, a connector element in an embodiment may require the user to provide data attributes unique to the user's specific integration process, such as choosing the name for the outbound file.

In an embodiment, a set properties element 312 may operate to set values for various document and process properties. The set properties element 312 in an embodiment may further allow or require the user to provide data attributes unique to the user's specific integration process, including, but not limited to a filename, or an email subject for the data being processed.

In an embodiment, a map element 314 may operate to transform data from one format to another or from one profile to another. The map element 314 in an embodiment may further allow or require the user to provide data attributes unique to the user's specific integration process, including, but not limited to the format to which the user wishes to transform the data.

The visual elements shown in FIG. 3 represent only a few examples of visual elements representing data integration processes, and it is contemplated the visual user interface may use other visual elements representing any type of data integration process that could be performed.

Figure 4:
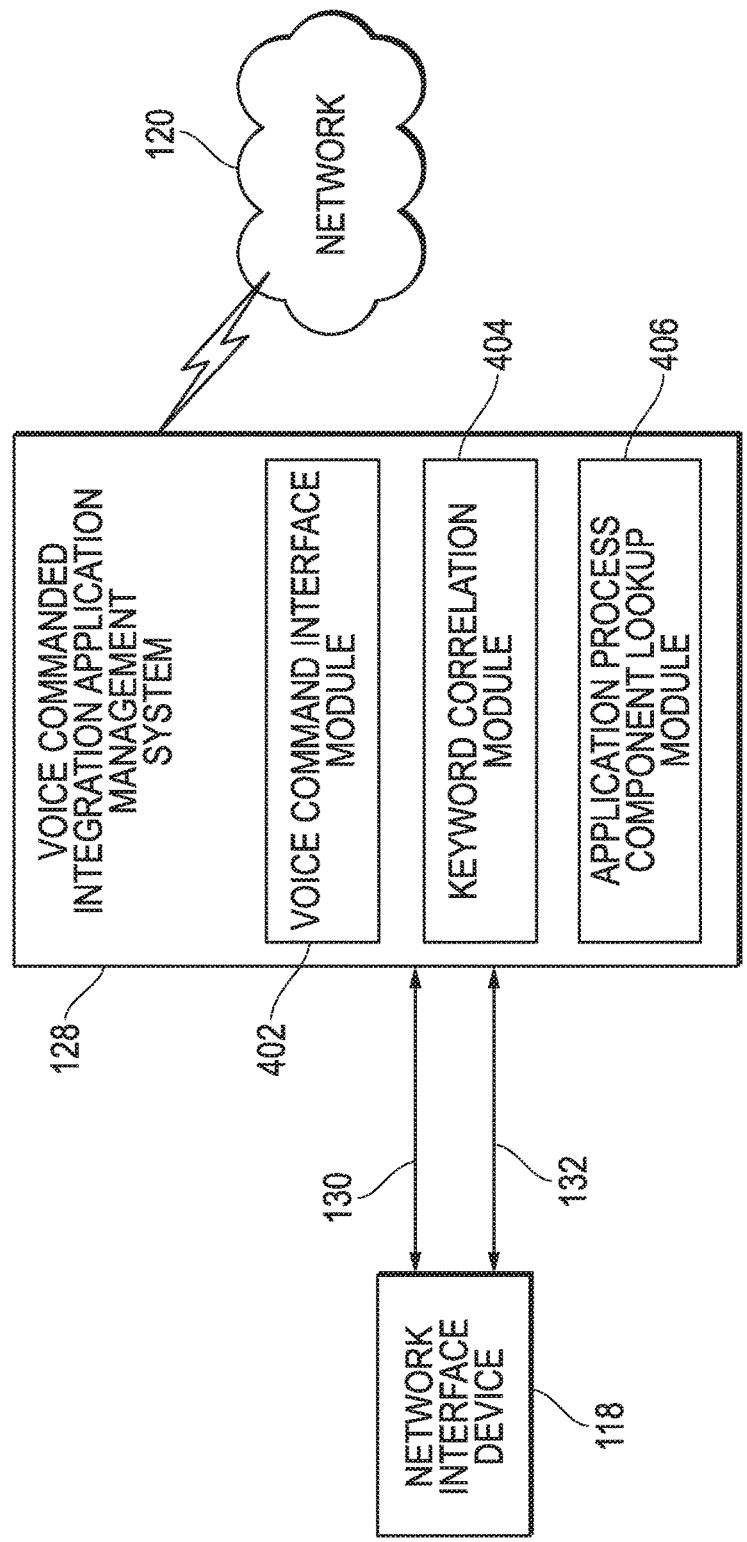
FIG. 4 is a block diagram illustrating a voice commanded integration application management system according to an embodiment of the present disclosure.

FIG. 4 is a block diagram illustrating a voice commanded integration application management system according to an embodiment of the present disclosure. A voice commanded integration application management system 128 in an embodiment may include a voice command interface module 402, a integrated data keyword correlation module 404, and an application process component lookup module 406. A voice command interface module 402 in an embodiment may operate to send and receive machine-readable, executable code instructions, and/or integrated data keywords to and from a voice recognition software system via the network 120, or via the network interface device 118 through network channels 130 and 132. The integrated data keyword correlation module 404 in an embodiment may operate to correlate an integrated data keyword with a customized software integration application, an authorized user, and/or a run-time engine through the use of a integrated data keyword correlation table. The integrated data keyword correlation module may also operate to associate an integrated data keyword with one or more process component names, process component values, process parameter names, process parameter values, and/or process order numbers through the user of a integrated data keyword/component correlation table. The application process component lookup module 406 in an embodiment may operate to correlate a process component name with a process component value, a process component parameter, a process component parameter value, a run-time engine, and/or a process order number through the use of an application process component lookup table.

Figure 5:
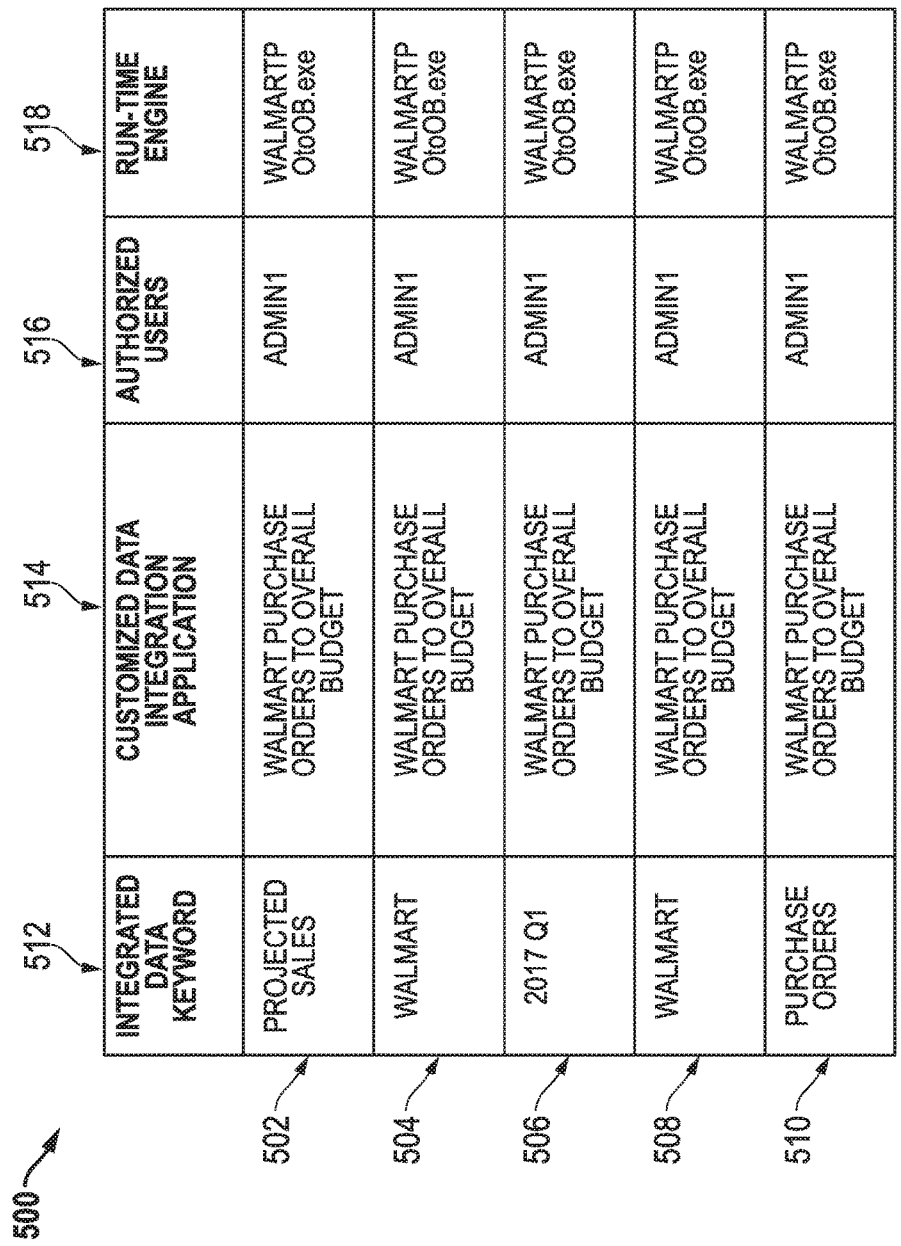
FIG. 5 is a graphical diagram illustrating an integrated data keyword/application correlation table according to an embodiment of the present disclosure.

FIG. 5 is a graphical diagram illustrating a integrated data keyword/application correlation table according to an embodiment of the present disclosure. As shown in FIG. 5, the integrated data keyword/application correlation table in an embodiment may incorporate rows 502-510 and columns 512-518. The integrated data keyword/application correlation table in an embodiment may operate to associate a user input with one or more integrated data keywords, and may also operate to associate an integrated data keyword with a customized software integration application, an authorized user, and/or a run-time engine. Each customized software integration application in an embodiment may be comprised of one or more run-time engines, connector codesets, trading partners codesets, and/or data profile codesets. As discussed above, the run-time engine operating to execute the instructions of the associated connector codesets, trading partner codesets, and/or data profile codesets comprises a customized software integration application. As also discussed above, each customized software integration application in an embodiment may be accessible only by authorized users. The integrated data keywords shown in column 512 of the integrated data keyword/application correlation table may be associated with a known library of integrated data keywords stored in memory. The library of integrated data keywords may be based upon a generalized library of integrated data keywords including words and phrases commonly used to instruct the processing of most computer programs, such as open, close, execute, go to, search, play, stop, call, message, calendar, or note, for example. In other aspects of an embodiment, the library of integrated data keywords may also contain words and phrases specific to the creation of customized software integration applications, the specific customized software integration applications available to an authorized user, and/or specific to the functionalities of the voice commanded integration application management system, such as "add connector," "add trading partner," and/or "define component parameter," for example. Each of the integrated data keywords given above are only a few examples of potential integrated data keywords and are not meant to limit the scope of this disclosure.

For example, as shown in row 502, the integrated data keyword/application correlation table in an embodiment may associate the integrated data keyword "projected sales" with the customized software integration application "Walmart Purchase Orders to Overall Budget," with an authorized user "Admin1" and with a run-time engine called "WalmartPOtoOB.exe." As another example, as shown in row 504, the integrated data keyword/application correlation table in an embodiment may also associate integrated data keyword "Walmart" with the customized software integration application "Walmart Purchase Orders to Overall Budget," with the authorized user "Admin1," and with the run-time engine called "WalmartPOtoOB.exe." As another example, as shown in row 506, the integrated data keyword/application correlation table in an embodiment may also associate integrated data keyword "2017 Q1" with the customized software integration application "Walmart Purchase Orders to Overall Budget," with the authorized user "Admin1," and with the run-time engine called "WalmartPOtoOB.exe."

As another example, as shown in row 508, the integrated data keyword/application correlation table in an embodiment may also associate the integrated data keyword "Walmart" with the customized software integration application "Walmart Purchase Orders to Overall Budget," with the authorized user "Admin1," and with the run-time engine called "WalmartPOtoOB.exe." As another example, as shown in row 510, the integrated data keyword/application correlation table in an embodiment may also associate integrated data keyword "Purchase Orders" with the customized software integration application "Walmart Purchase Orders to Overall Budget," with the authorized user "Admin1," and with the run-time engine called "WalmartPOtoOB.exe."

Figure 6:
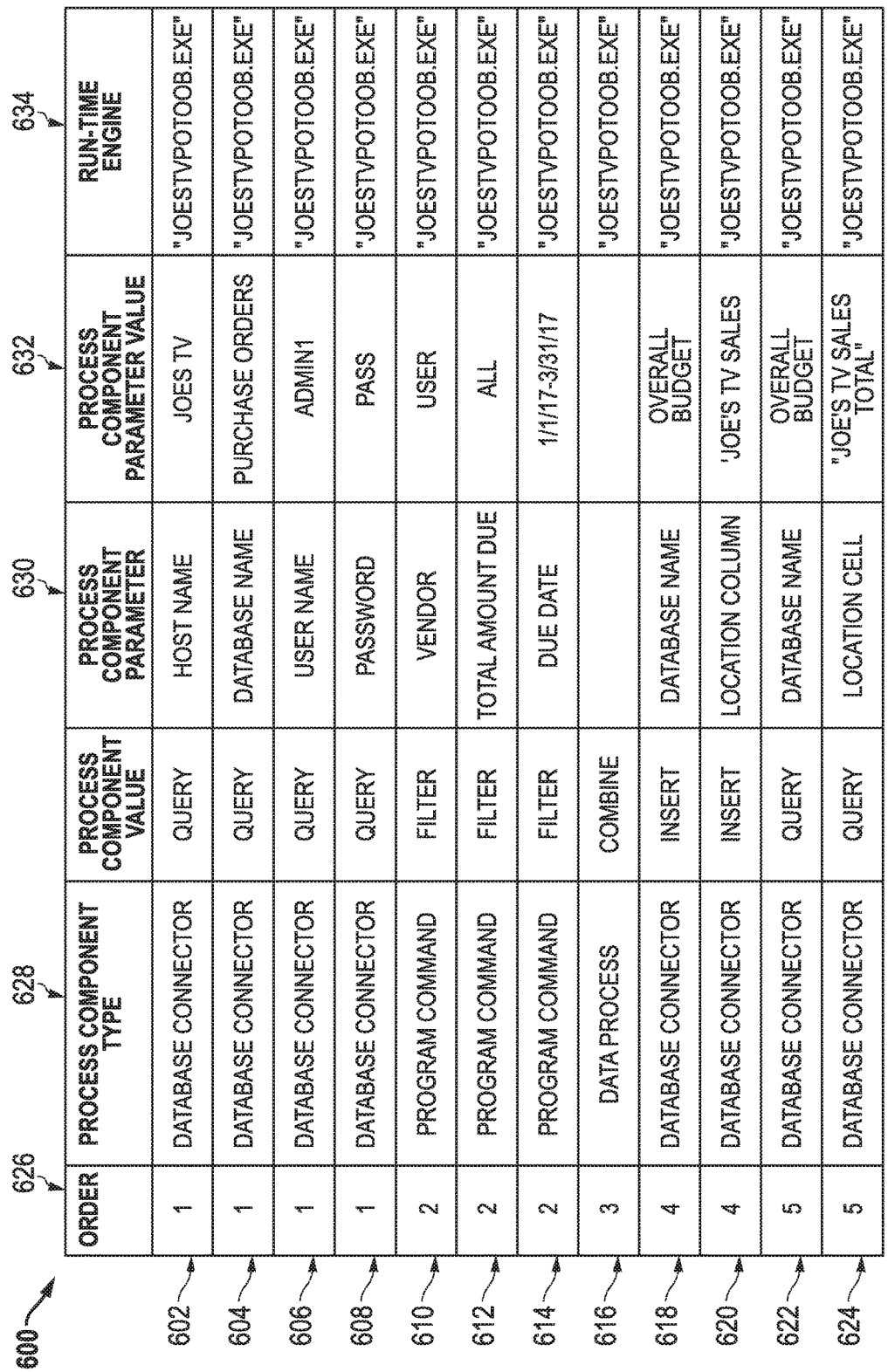
FIG. 6 is a graphical diagram illustrating an application process component lookup table according to an embodiment of the present disclosure.

FIG. 6 is a graphical diagram illustrating an application process component lookup table according to an embodiment of the present disclosure. FIG. 6 is an illustration of one way in which the voice commanded integration application management system may correlate process components with the order in which the process component falls within a modeled integration process, the process component value, a process component parameter, the process component parameter value, and the run-time engine that operates to execute the codesets associated with each of these elements. Although FIG. 6 depicts this correlation in the format of a look-up table, real-time execution of a customized software integration application may not require a look-up table, but rather, may involve retrieval of correlated codesets from a memory and transmission of those codesets to the user.

As shown in FIG. 6, an application process component lookup table may include rows 602-624 and columns 626-634. The application process component lookup module in an embodiment may access an application process component lookup table in order to create a new customized software integration application in response to a user's voice commands received by the voice commanded integration application management system.

As discussed above, a user may generate a flow diagram in an embodiment by providing a chronology of process-representing visual elements via the use of a visual user interface. As also discussed above, the visual user interface in an embodiment may provide a visual designer environment permitting a user to define process flows between applications/systems, such as between trading partner and enterprise systems, and to model a customized business integration process. The visual user interface in an embodiment may provide a menu of pre-defined user-selectable visual elements and permit the user to arrange them as appropriate to model a process. The elements may include visual, drag-and-drop icons representing specific units of work (process components) required as part of the integration process, such as invoking an application-specific connector, transforming data from one format to another, routing data down multiple paths of execution by examining the contents of the data, business logic validation of the data being processed, etc. Further, the graphical user interface in an embodiment may allow the user to define the parameters of a process component by providing user input, which the customized data integration software application creation system may correlate with a data profile codeset, also stored in a memory of the customized data integration software application creation system.

The component/integrated data keyword correlation module in an embodiment may allow the user to generate a flow diagram with or without the use of the visual user interface, by receiving integrated data keywords associated with user voice commands, and associating those integrated data keywords with process components and parameters defining process flows between applications/systems. The application process component lookup module may associate each integrated data keyword with one of the same pre-defined user-selectable process components available within the visual user interface's menu of pre-defined user-selectable visual elements or with one of the pre-defined user selectable process component parameters available with the visual user interface's menu of pre-defined parameters available for the given pre-defined user-selectable visual element. The application process component lookup module in an embodiment may perform these operations by accessing an application process component lookup table in order to create a new customized software integration application in response to integrated data keywords associated with a user's voice commands received by the voice commanded integration application management system.

As shown in FIG. 6, an application process component lookup table may associate a process component action with an order of operations, a process component action value, a process component parameter, and/or a value of a process component parameter. Take for example, the scenario in which the user wishes to generate a customized data integration allowing him to access his vendor's (Joe's TV) purchase order database in order to determine the sales the user will make to Joe's TV during a set time period. Such a new customized software integration application may require several steps, each represented by a process component. Each process component may require or allow for further user input in the form of special parameters further defining the specific actions taken by each process component.

For example, as shown in row 602 in an embodiment, the application process component lookup table may associate the process component action "database connector" (as shown in column 628) placed first in the order of operations (as shown in column 626) with a process component action value of "query," in order to instruct the voice commanded integration application management system to generate a new customized software integration application with a first visual element being a database connector, the action to be taken by that database connector being to query the database. The application process component lookup table may further associate the process component action "database connector" in row 602 with the process component parameter (as shown in column 630) "host name" and a process component parameter value (as shown in column 632) "Joe's TV." In such a way, the application process component lookup table in an embodiment may create a process step that instructs the run-time engine (as shown in column 634) associated with the new customized software integration application to query a database hosted by Joe's TV.

The application process component lookup table may further associate the process component action "database connector" in row 604 with the process component parameter "database name" and a process component parameter value "Purchase Orders." In such a way, the application process component lookup table in an embodiment may create a process step that instructs the run-time engine associated with the new customized software integration application to query a specific database hosted by Joe's TV called "purchase orders." The application process component lookup table may further associate the process component action "database connector" in row 606 with the process component parameter "user name" and a process component parameter value "Admin1." The application process component lookup table may further associate the process component action "database connector" in row 606 with the process component parameter "password" and a process component parameter value "PASS." In such a way, the application process component lookup table in an embodiment may create a process step that instructs the run-time engine associated with the new customized software integration application to access the specific database hosted by Joe's TV called "purchase orders," by logging in to the specific database as "Admin1," and providing the password "PASS."

As another example, as shown in row 610 in an embodiment, the application process component lookup table may associate the process component action "program command" placed second in the order of operations with a process component action value of "filter," in order to instruct the voice commanded integration application management system to generate a new customized software integration application with a second visual element being a program command, the action to be taken by that program command being to filter search results from the database. The application process component lookup table may further associate the process component action "program command" in row 610 with the process component parameter "vendor" and a process component parameter value "User."

In such a way, the application process component lookup table in an embodiment may create a process step that instructs the run-time engine associated with the new customized software integration application to filter results from Joe's TV database named "purchase orders," such that the data integration application only pulls purchase orders between Joe's TV and the User. The application process component lookup table may further associate the process component action "program command" in row 612 with the process component parameter "total amount due" and a process component parameter value "all." The application process component lookup table may further associate the process component action "program command" in row 614 with the process component parameter "due date" and a process component parameter value "1/1/17-3/31/17." In such a way, the application process component lookup table in an embodiment may create a process step that instructs the run-time engine associated with the new customized software integration application to gather the values of the total amounts due shown in each of the purchase orders between Joe's TV and the User that are anticipated to be filled in the first quarter of 2017.

As another example, and as shown in row 616 in an embodiment, the application process component lookup table may associate the process component action "data process" placed third in the order of operations with a process component action value of "combine," in order to instruct the voice commanded integration application management system to generate a new customized software integration application with a third visual element being a data process, the action to be taken by that data process being to combine all results from the prior step into a single file. In other words, with respect to the step taken second in the order of operations, the data process component may operate to combine all gathered values of the total amounts due shown in each of the purchase orders between Joe's TV and the User that will are anticipated to be filled in the first quarter of 2017 into a single document.

As another example, and as shown in row 618, in an embodiment, the application process component lookup table may associate the process component action "database connector" placed fourth in the order of operations with a process component action value of "insert," in order to instruct the voice commanded integration application management system to generate a new customized software integration application with a fourth visual element being a database connector, the action to be taken by that database connector being to insert the data produced from the previous step into another database at a given location. The application process component lookup table may further associate the database connector action "insert" in row 618 with the process component parameter "location" and a process component parameter value "overall budget." The application process component lookup table may further associate the process component action "database connector" in row 620 with the process component parameter "column location" and a process component parameter value "Joe's TV sales." In such a way, the application process component lookup table in an embodiment may create a process step that instructs the run-time engine associated with the new customized software integration application to insert each of the values listed in the combined document produced by the third operation into the user's database called "overall budget," within the column named "Joe's TV sales." In such a way, the application process component lookup table in an embodiment may create a process step that instructs the run-time engine associated with the new customized software integration application to insert each of the values listed in the combined document produced by the third operation into the user's database called "overall budget," within the column named "Joe's TV sales."

As another example, and as shown in row 622, in an embodiment, the application process component lookup table may associate the process component action "database connector" placed fifth in the order of operations with a process component action value of "query," in order to instruct the voice commanded integration application management system to generate a new customized software integration application with a fifth visual element being a database connector, the action to be taken by that database connector being to query the database into which the process inserted the integrated data in the previous step. The application process component lookup table may further associate the database connector action "query" in row 622 with the process component parameter "location" and a process component parameter value "overall budget." The application process component lookup table may further associate the process component action "database connector" in row 624 with the process component parameter "cell location" and a process component parameter value "Joe's TV Sales TOTAL." The cell "Joe's TV Sales TOTAL" in the "overall budget" database in an embodiment may operate to total all of the values listed in the column "Joe's TV Sales," into which the run-time engine inserted each of the values listed in the combined document produced by the third operation. In such a way, the run-time engine may receive a single value representing the total sum of all sales to Joe's TV expected to occur in the first quarter of 2017.

FIG. 7 is a graphical diagram illustrating a integrated data keyword/component lookup table according to an embodiment of the present disclosure. The integrated data keyword/component lookup table in an embodiment may comprise rows 702-714 and columns 716-726. As discussed above, a user may generate a new customized software integration application by creating a flow chart comprising one or more visual elements representing a step in a data integration process. Each visual element chosen for user in a user-defined flow chart represents a generic process component which may be further tailored by defining a specific action the process should undergo at that component, or by defining specific parameters outlining details of the specific action the process should undergo at that component. In an embodiment, the integrated data keyword correlation module may operate to associate an integrated data keyword with a process component, a process component action value, a process parameter, a process parameter value, and/or a process order number. The integrated data keyword correlation module in an embodiment may perform that operation by accessing the integrated data keyword/component lookup table, as shown in FIG. 7.

For example, as shown in row 702, an integrated data keyword (as shown in column 716) "database connector" in an embodiment may be associated with a process component action (as shown in column 718) "database connector." As another example, as shown in row 704, an integrated data keyword "query" in an embodiment may be associated with a process component action value (as shown in column 720) of "query." As another example, as shown in row 706, an integrated data keyword "Joe's TV" in an embodiment may be associated with a process parameter (as shown in column 722) "host name," and a process parameter value (as shown in column 724) "Joe's TV." As another example, as shown in row 708, an integrated data keyword "purchase order database" may be associated with a process parameter (as shown in column 722) "database name," and a process parameter value (as shown in column 724) "purchase orders." As another example, and as shown in row 710, an integrated data keyword "position one" in an embodiment may be associated with an operation order number "1" as shown in column 726. As another example, and as shown in row 712, an integrated data keyword of "user name is admin1" in an embodiment may be associated with a process parameter 722 "user name" and a process parameter value (as shown in column 724) "Admin1." As yet another example, and as shown in row 714, the integrated data keyword "password is PASS" in an embodiment may be associated with a process parameter (as shown in column 722) "password" and a process parameter value (as shown in column 724) "PASS."

The integrated data keywords shown in column 712 of the integrated data keyword/component correlation table may be associated with a known library of integrated data keywords stored in memory. As discussed above, the library of integrated data keywords may be based upon a generalized library of integrated data keywords including words and phrases commonly used to instruct the processing of most computer programs, such as open, close, execute, go to, search, play, stop, call, message, calendar, or note, for example. As also discussed above, in other aspects of an embodiment, the library of integrated data keywords may also contain words and phrases specific to the creation of customized software integration applications, the specific customized software integration applications available to an authorized user, and/or specific to the functionalities of the voice commanded integration application management system, such as "add connector," "add trading partner," and/or "define component parameter," for example. Each of the integrated data keywords given above is only a few examples of potential integrated data keywords and is not meant to limit the scope of this disclosure.

Figure 8:
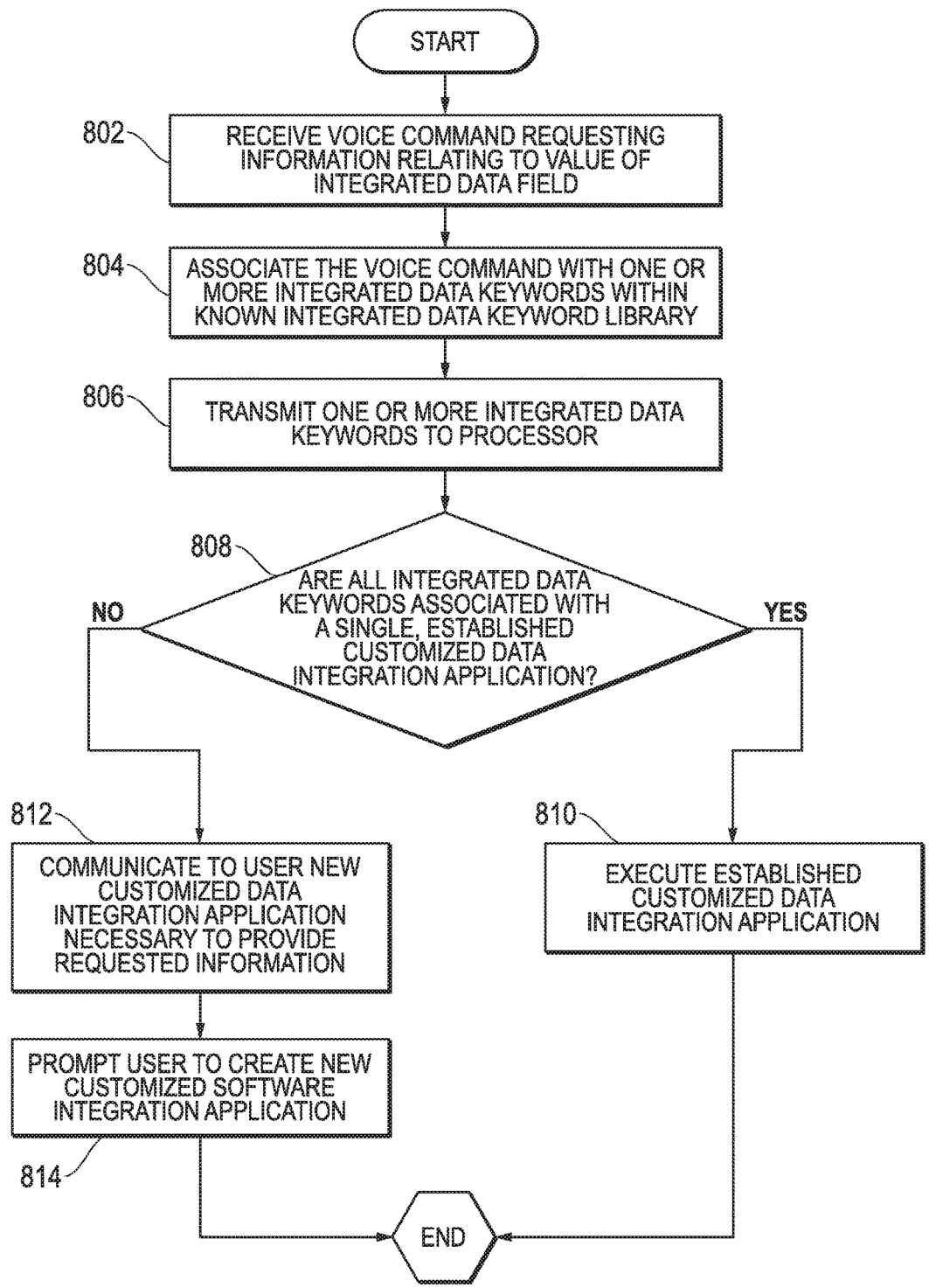
FIG. 8 is a flow diagram illustrating a method for associating a voice command requesting a value of an integrated data field with a customized software integration application according to an embodiment of the present disclosure.

FIG. 8 is a flow diagram illustrating a method for associating a voice command requesting a value of an integrated data field with a customized software integration application according to an embodiment of the present disclosure. The method may include one or more of receiving a voice command requesting a value of an integrated data field, associating the voice command with one or more integrated data keywords within a known integrated data keyword library, transmitting the one or more integrated data keywords to the voice command interface module, determining whether integrated data keywords are associated with a single, established customized software integration application, and if they are, executing the established customized software integration application. The method may further include, if all integrated data keywords are not associated with a single, established customized software integration application, communicating the user a new customized software integration application needs to be generated in order to provide the requested information, and prompting the user to create a new customized software integration application.

At block 802 in an embodiment, the voice recognition system may receive a voice user input requesting a value of an integrated data field. As an example, the voice recognition system in an embodiment may receive a voice user input requesting the voice commanded integration application management system to calculate the projected sales to Walmart for the first quarter of 2017. As another example, the voice recognition system in an embodiment may receive a voice user input requesting the voice commanded integration application management system to calculate the projected sales to Joe's TV for the first quarter of 2017. As discussed above, Walmart has a known system of data integration among its suppliers and vendors, and is likely to be associated with an already established trading partner codeset. However, Joe's TV may be a smaller vendor, and there may not be an already established trading partner codeset dictating how information may be exchanged between Joe's TV databases and its suppliers.

At block 804, in an embodiment, the voice recognition system may associate the voice user input with one or more integrated data keywords within a known integrated data keyword library. As an example, the voice recognition system may associate the voice user input "calculate the projected sales to Walmart for the first quarter of 2017" with the known integrated data keywords "Walmart," "Projected Sales," and "2017 Q1." As another example, the voice recognition system may associate the voice command "calculate the projected sales to Joe's TV for the first quarter of 2017" with the known integrated data keywords "Joe's TV," "Projected Sales," and "2017 Q1." As discussed above, the library of known integrated data keywords may include generalized computing commands, but may also include commands specific to the voice commanded data integration application management system or to a particular user, such as the names of process components associated with visual elements, the names of trading partners, the names of process component actions, the names of available process component parameters, the names of the user's common vendors, and/or the names of the user's common vendors' databases.

At block 806, in an embodiment, the voice recognition system may transmit the one or more integrated data keywords to the processor. In an embodiment, the voice recognition system may transmit the one or more integrated data keywords identified in block 804 above to the voice command interface module. For example, in an embodiment, the voice recognition system may transmit the integrated data keywords "Walmart," "Projected Sales," and "2017 Q1" to the voice command interface module. In another example embodiment, the voice recognition system may transmit the integrated data keywords "Joe's TV," "Projected Sales," and "2017 Q1" to the voice command interface module.

At block 808, in an embodiment, the integrated data keyword correlation module may determine whether all of the identified data integrated data keywords are associated with a single, established customized software integration application. For example, in the embodiment described with reference to FIG. 5, the integrated data keyword correlation module may determine each of the identified data integrated data keywords "Walmart," "Projected Sales," and "2017 Q1" are associated with a single, established customized software integration application called "Walmart Purchase Orders to Overall Budget," as shown in rows 502-506. As another example, the integrated data keyword correlation module may determine that there is no single, established customized software integration application associated with all three phrases "Joe's TV," "Projected Sales," and "2017 Q1."

At block 810, in an embodiment, if the integrated data keyword correlation module determines all of the identified data integrated data keywords are associated with a single, established customized software integration application, the voice commanded integration application management system may instruct the run-time engine associated with the established customized software integration application to execute the established customized software integration application. For example, with reference to the embodiment described with reference to FIG. 5, and as shown in rows 502-506, if the integrated data keyword correlation module determines all of the identified data integrated data keywords "Walmart," "Projected Sales," and "2017 Q1" are associated with the single, established customized software integration application "Walmart Purchase Orders to Overall Budget," the voice commanded integration application management system may instruct the run-time engine "WalmartPOtoOB.exe," associated with the established customized software integration application, to execute the "Walmart Purchase Orders to Overall Budget" integration application program.

At block 812, in an embodiment, if the integrated data keyword correlation module determines all of the identified data integrated data keywords are not associated with a single, established customized software integration application, the voice command interface module may communicate to the user that a new customized software integration application must be generated in order to provide the requested information. As an example, if the integrated data keyword correlation module determines there is not a single, established customized software integration application associated with all of the integrated data keywords "Joe's TV," "Projected Sales," and "2017 Q1," the voice command interface module may communicate to the user that a new customized software integration application must be generated in order to calculate projected sales to Joe's TV for the first quarter of 2017. The method by which the voice recognition system may communicate instructions, queries, or outputs to the user via microphone is described in greater detail below with reference to FIG. 14.

At block 814, in an embodiment, the voice command interface module may prompt the user to create a new customized software integration application. For example, in an embodiment, the voice command interface module may communicate machine-readable, executable code instructions directing the voice recognition system to ask the user whether he would like to create a new data integration application program that will calculate projected sales to Joe's TV for the first quarter of 2017. The method by which the voice recognition system may communicate instructions, queries, or outputs to the user via microphone is described in greater detail below with reference to FIG. 14.

Figure 9:
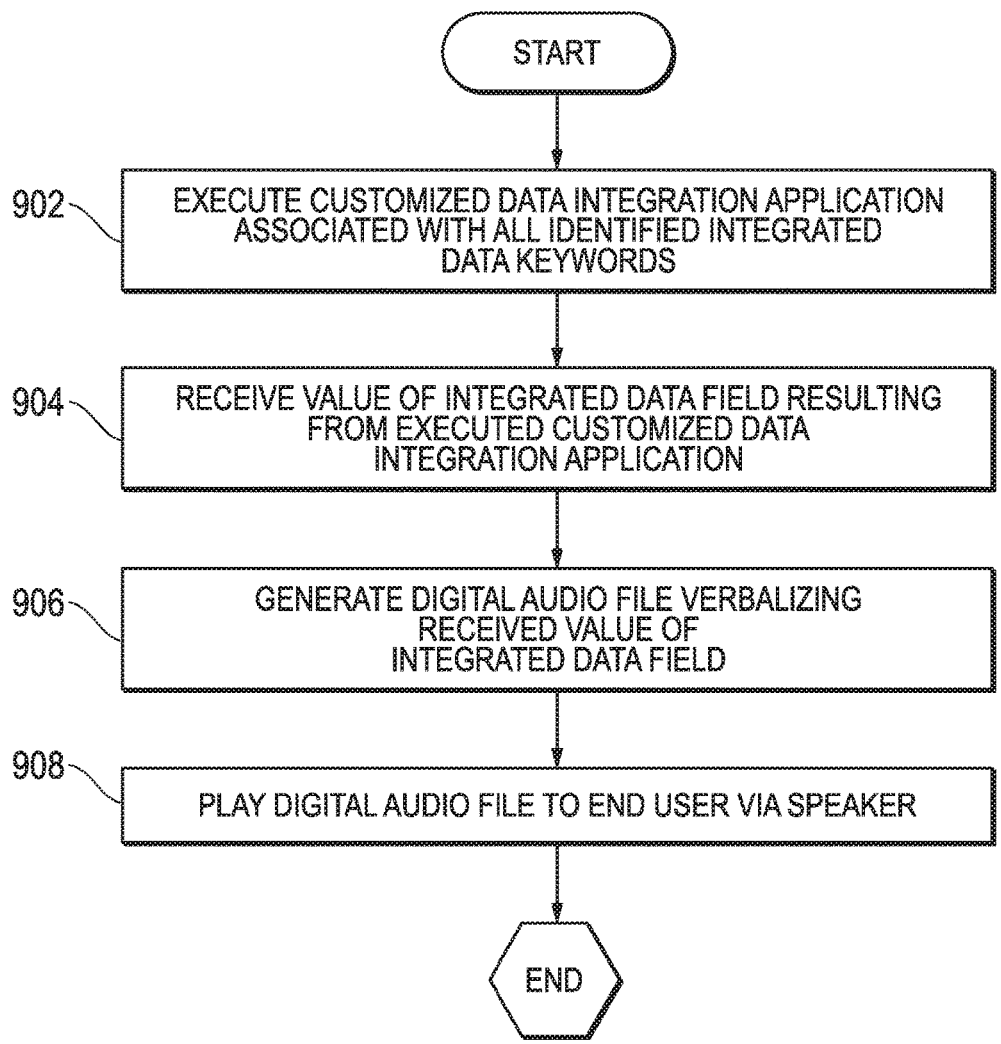
FIG. 9 is a flow diagram illustrating a method for communicating the results of a requested customized software integration application to a user according to an embodiment of the present disclosure.

FIG. 9 is a flow diagram illustrating a method for communicating the results of a requested customized software integration application to a user according to an embodiment of the present disclosure. The method may include one or more of executing a customized software integration application associated with all identified integrated data keywords within a user's voice command, receiving a value of an integrated data field resulting from an executed customized software integration application, generating a digital audio file verbalizing the received value of the integrated data field, and playing the digital audio file to the end user via a speaker. At block 902, in an embodiment, the voice commanded integration application management system may instruct the run-time engine within an existing customized software integration application to execute the existing customized software integration application. For example, in one of the embodiment described with reference to FIG. 5, the voice commanded integration application management system may instruct the run-time engine "WalmartPOtoOB.exe" to execute the customized software integration application "Walmart Purchase Orders to Overall Budget."

At block 904, in an embodiment, the run-time engine may receive a value of an integrated data field resulting from an executed customized software integration application. As discussed above, a customized software integration application in an embodiment may involve initiating contact with a specifically identified third party data repository, such as, for example, a database. The customized software integration application in such an embodiment may proceed to access data from the specifically identified third party data repository, perform processing operations on the data, and eventually insert the processed data into one of the user's data repositories. The customized software integration application in such an embodiment may also query the data repository into which it inserted the processed data in order to receive a single value stored in a single cell of the user's data repository. That single value stored in a single cell of the user's data repository may take the form of a single data element. At block 904, the run-time engine may receive such a single data field within a single cell of the user's data repository. For example, in one of the embodiments described with reference to FIG. 6 in rows 622-624, the run-time engine may query the user's database "overall budget" to retrieve the information stored in the specific cell "Joe's TV Sales TOTAL" which may operate to total all of the values listed in the column "Joe's TV Sales," into which the run-time engine inserted each of the values listed in the combined document produced by the third operation of the customized software integration application at row 616. In such a way, the run-time engine may receive a single value in the form of a data element representing the total sum of all sales to Joe's TV expected to occur in the first quarter of 2017. The run-time engine may receive this single value in the form of a data element by executing an established customized software integration application or by executing a newly created customized software integration application.

At block 906, in an embodiment, the voice recognition system may generate a digital audio file verbalizing the received value of the integrated data field. Upon receipt of the data field stored in a specific cell by the run-time engine, the run-time engine in an embodiment may communicate that data field to the voice command interface module, which may communicate that data field to the voice recognition system. Alternatively, the run-time engine in an embodiment may communicate that data field directly to the voice recognition system. In an embodiment, once the voice recognition system receives the data field, it may generate a digital audio file verbalizing the received value of the integrated data field. The process by which the voice recognition system may generate a digital audio file verbalizing data is discussed in greater detail below. For example, with reference to the embodiment described with respect to FIG. 6, the voice recognition system may receive the single value stored in the cell "Joe's TV Sales TOTAL" representing the total sum of all sales to Joe's TV expected to occur in the first quarter of 2017.

At block 908, in an embodiment, the voice recognition system may play the digital audio file to the end user via a speaker. In an embodiment, the voice recognition system may play the digital audio file to the end user via a speaker, and thus, verbally provide the results of the specifically requested customized software integration application. For example, in an embodiment where the user begins with a voice input request to calculate the projected sales to Joe's TV for the first quarter of 2017, at block 908, the voice recognition system may play a digital audio file communicating the single value stored in the cell "Joe's TV Sales TOTAL" representing the total sum of all sales to Joe's TV expected to occur in the first quarter of 2017 via a speaker. In such a way, the information handling system described herein may provide an end to end service allowing a user to request specific information resulting from a customized data integration process, and, in response, playing an audio recording providing that specifically requested information in response.

Figure 10:
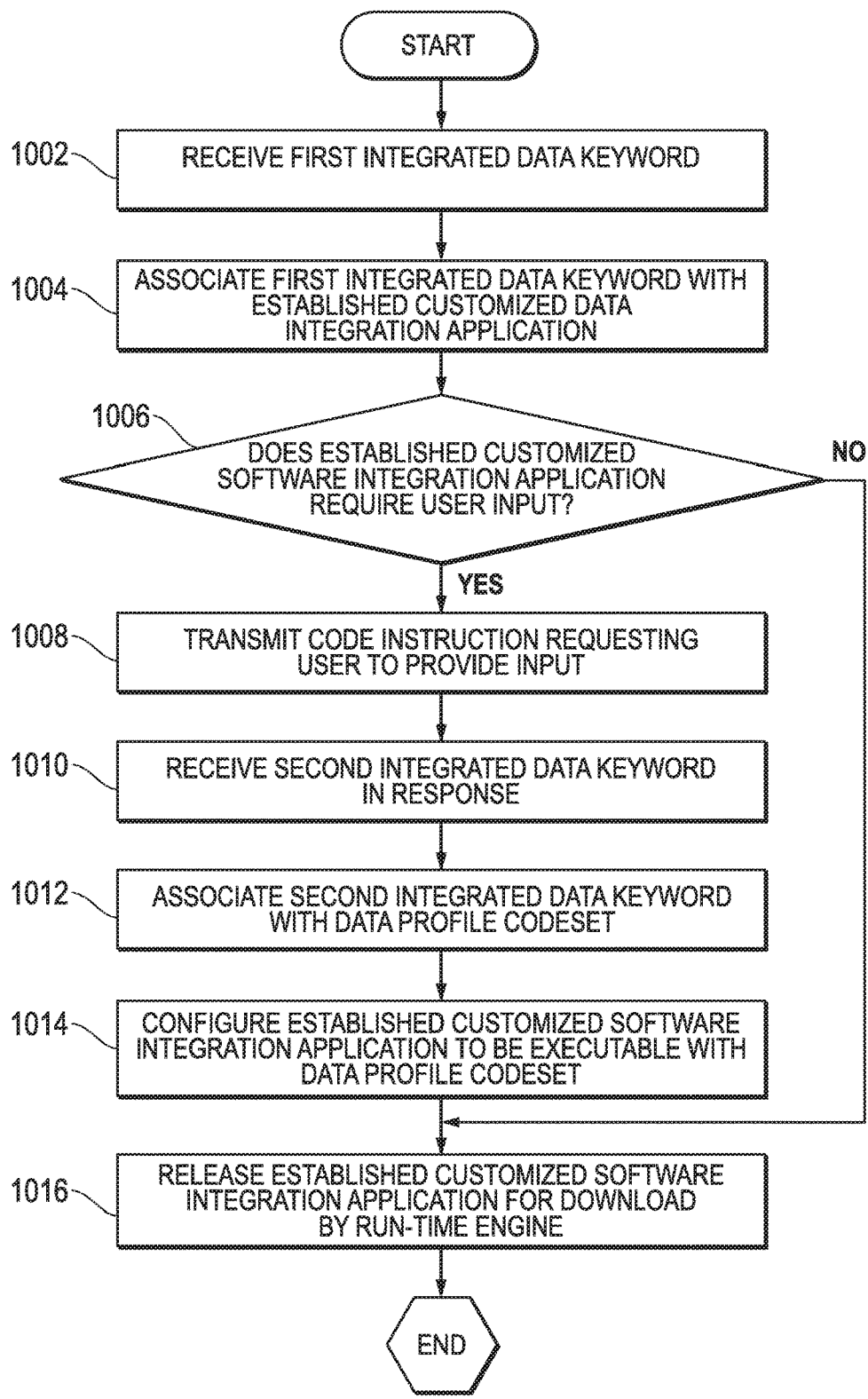
FIG. 10 is a flow diagram illustrating a method of releasing a customized software integration application for download by the run-time engine according to an embodiment of the present disclosure.

FIG. 10 is a flow diagram illustrating a method of releasing a customized software integration application for download by the run-time engine according to an embodiment of the present disclosure. The method may include one or more of receiving a first integrated data keyword associated with a request to execute an established customized software integration application, associating the first integrated data keyword with an established customized software integration application, determining whether the established customized software integration application requires user input, and if it does not, releasing the established customized software integration application for download by the run-time engine. The method may also include, if the established customized software integration application does require user input, transmitting code instructions to the voice recognition system requesting the user to provide input, receiving a second integrated data keyword associated with a voice user input response, associating the second integrated data keyword with a data profile codeset, and releasing the established customized software integration application for download by the run-time engine.

As shown in FIG. 10, at block 1002 in an embodiment, the voice command interface module may receive a first integrated data keyword associated with a voice request to execute and established customized software integration application. For example, the voice command interface module in an embodiment may receive a voice user input request to integrate Walmart purchase orders, process that voice user input, and associate the processed voice user input with one or more first integrated data keywords "Walmart" and "purchase orders," and may transmit those one or more first data integrated data keywords to the voice command interface module. The method by which the voice recognition system may process voice user inputs and associate processed voice user inputs with integrated data keywords is described in greater detail below with respect to FIG. 13.

At block 1004, in an embodiment, the integrated data keyword correlation module may associate the first integrated data keywords with an established customized software integration application. In an embodiment, the integrated data keyword correlation module may associate the first integrated data keywords with an established customized software integration application by using a integrated data keyword correlation table. For example, in one of the embodiments described with reference to FIG. 5, at rows 508 and 510, the integrated data keyword correlation module may access the integrated data keyword correlation table to correlate the first integrated data keywords "Walmart" and "Purchase Orders" with a single, established customized software integration application named "Walmart Purchase Orders to Overall Budget."

At block 1006, in an embodiment, the integrated data keyword correlation module may also determine whether the identified established customized software integration application requires user input. As discussed above, each process component associated with a visual element may be identifiable by a process component type, and may further include an action to be taken. For example, a process component may be identified as a "connector" component. Each "connector" component, when chosen and added to the process flow in the visual user interface, may provide a drop down menu of different actions the "connector" component may be capable of taking on the data as it enters that process step. The action the user chooses from the drop down menu may be associated with a process component action value. The process component name and value may be associated with a connector codeset stored in a memory of the customized data integration software application creation system. Further, the graphical user interface in an embodiment may allow the user to define the parameters of process components by providing user input, which the customized data integration software application creation system may correlate with a data profile codeset, also stored in a memory of the customized data integration software application creation system. If a process component requires a process component action value, or a process component parameter value, and the established customized software integration application is not currently associated with an entry for each of those values, user input may be required in order to execute that established customized software integration application.

The integrated data keyword correlation module in an embodiment may determine whether the identified established customized software integration application requires user input by using a integrated data keyword correlation table to determine whether the customized software integration application is currently associated with an entry for each of the required process component action values and/or process component parameter values. As an example, process parameters may include user name and password. In such an example embodiment, an established customized software integration application may need to be associated with values for the process parameters user name and password in order to be executed. In an example embodiment, this may be a form of authorization of a user. In other embodiments, authorization may be received from other inputs including via a keyboard system, biometric input, image recognition, or other authorization system to associate an authorized user or information handling system.

In one of the example embodiments described with reference to FIG. 5, at blocks 508 and 510, the integrated data keyword correlation module may access the integrated data keyword correlation table to determine a requested, existing customized software integration application named "Walmart Purchase Orders to Overall Budget" is only accessible by the authorized user "Admin1," and determine the application "Walmart Purchase Orders to Overall Budget" can only be executed if the user provides the user name and password associated with the authorized user "Admin1." If the integrated data keyword correlation module in an embodiment determines user input is required in order to execute the identified, established customized software integration application, the method may proceed to block 1008. If the integrated data keyword correlation module in an embodiment determines no user input is required in order to execute the identified, established customized software integration application, the method may proceed to block 1016.

At block 1008, in an embodiment, the voice command interface module may transmit code instructions to the voice recognition system instructing it to request the user to provide the necessary user input. In an embodiment, the voice command interface module may transmit code instructions in the form of machine-readable, executable code instructions instructing the voice recognition system to generate a digital audio file communicating the name of the necessary user input and requesting the user to provide that user input. For example, in an embodiment, the voice command interface module may transmit code instructions to the voice recognition system instructing it to generate a digital audio file communicating the need for the user to provide the user name and password. The method used to generate a digital audio file requesting user input is described in greater detail below.

At block 1010, in an embodiment, the voice command interface module may receive a second integrated data keyword associated with a voice user input responding to the request to provide input. In an embodiment, the voice recognition system may receive a voice user input response to the request for the user to provide the necessary user input, process that voice user input response, associate the processed voice user input response with one or more second integrated data keywords, and transmit the one or more second integrated data keywords to the voice command interface module. The voice user input may include, but may not be limited to a name of an established customized software integration application, a name of a trading partner, a name of a process component action, a value of a process component action, a name of a process component parameter, and a value of a process component parameter. For example, in an embodiment, the voice recognition system may receive a voice user input response identifying the user as Admin1 (which is a needed value of a process component parameter), process the voice user input, associate the processed voice user input with second integrated data keyword "user name" and "Admin1," and transmit the second integrated data keywords "user name" and "Admin1" to the voice command interface module. In another example embodiment, the voice recognition system may receive a voice user input response identifying the user password as PASS, process the voice user input, associate the processed voice user input with second integrated data keywords "password" and "PASS," and transmit the second integrated data keywords "password" and "PASS" to the voice command interface module. The method by which the voice recognition system may process voice user inputs and associate the processed voice user inputs with integrated data keywords is described in greater detail below.

At block 1012, in an embodiment, the integrated data keyword correlation module may associate the second integrated data keywords with a data profile codeset. In an embodiment, the integrated data keyword correlation module may use the integrated data keyword correlation table to associate the one or more second integrated data keywords with one or more data profile codesets. For example, in one embodiment described with reference to FIG. 7 at rows 712 and 714, the integrated data keyword correlation module may associate the second integrated data keywords "user name" and "Admin1" with the process parameter "User Name" and the process parameter value "Admin1." In a further aspect, the application process component lookup module may access the integrated data keyword/component lookup table and associate the second integrated data keywords "password" and "PASS" with a process parameter "Password" and a process parameter value "PASS." As described above, each of the process parameters and process parameter values identified in the integrated data keyword/component lookup table are associated with a data profile codeset. In such a way, the integrated data keyword correlation module may associate the second integrated data keywords with data profile codesets entering the phrase "Admin1" as the value of the process parameter "user name" and entering the phrase "PASS" as the value of the process parameter "Password."

At block 1014, in an embodiment, the voice commanded integration application management system may configure the established customized software integration application to be executable with the data profile codeset. In an embodiment, the voice commanded integration application management system may configure the established customized software integration application user has requested to execute in block 1002 to be executable with the data profile codeset identified in block 1012. As discussed above, a customized software integration application in an embodiment may include a dynamic runtime engine which is an executable software application capable of running on a computer within the enterprise's network or within a third party network located remotely from both the provider of the website and the enterprise network, at least one of a connector codeset and a trading partner codeset, and optionally, one or more data profile codesets. The dynamic runtime engine, when initiated, in an embodiment, may download all connector codesets, trading partner codesets, and data profile codesets associated with the run-time engine, and execute those code instructions to perform the integration process modeled by the visual flowchart generated by the user.

As discussed above, an integration application process component represented by a visual element in an embodiment may correspond to a modeled integration process defined in a connector codeset, but may not itself be configured for use with any particular enterprise, or any particular trading partner. Accordingly, the connector codeset corresponding to a process component may not yet be ready for execution to provide business integration functionality for any particular trading partner or enterprise until the connector codeset corresponding to a process component is configured to be executable with additional code and/or data in the form of one or more integration data profile codesets incorporating user-specific information.

At block 1014, in an embodiment, the voice commanded integration application management system may configure the connector codesets or trading partner codesets associated with the customized software integration application to be executable with any associated data profile codesets. For example, the voice commanded integration application management system in one of the embodiments described with reference to FIG. 7 may configure the connector codesets associated with the established customized software integration application "Walmart Purchase Orders to Overall Budget" to be configurable with the data profile codeset associated with the process parameter "User Name" and the process parameter value "Admin1," and with the data profile codeset associated with the process parameter "Password" and a process parameter value "PASS."

At block 1016, in an embodiment, the voice commanded integration application management system may then release the codesets associated with the established customized software integration application for download by the run-time engine. As described above, a customized software integration application may include one or more connector codesets, trading partner codesets, and/or data profile codesets, and a run-time engine located at the user's server to execute each of the connector codesets, trading partner codesets, and/or data profile codesets. As described in greater detail below, in order to execute these connector codesets, trading partner codesets, and data profile codesets, the run-time engine in an embodiment may download the codesets to the user's server. For example, in the embodiment described in the paragraph above, the voice commanded integration application management system may release for download by the runtime engine the data profile codesets entering the phrase "Admin1" as the value of the process parameter "user name" and entering the phrase "PASS" as the value of the process parameter "Password."

Figure 11:
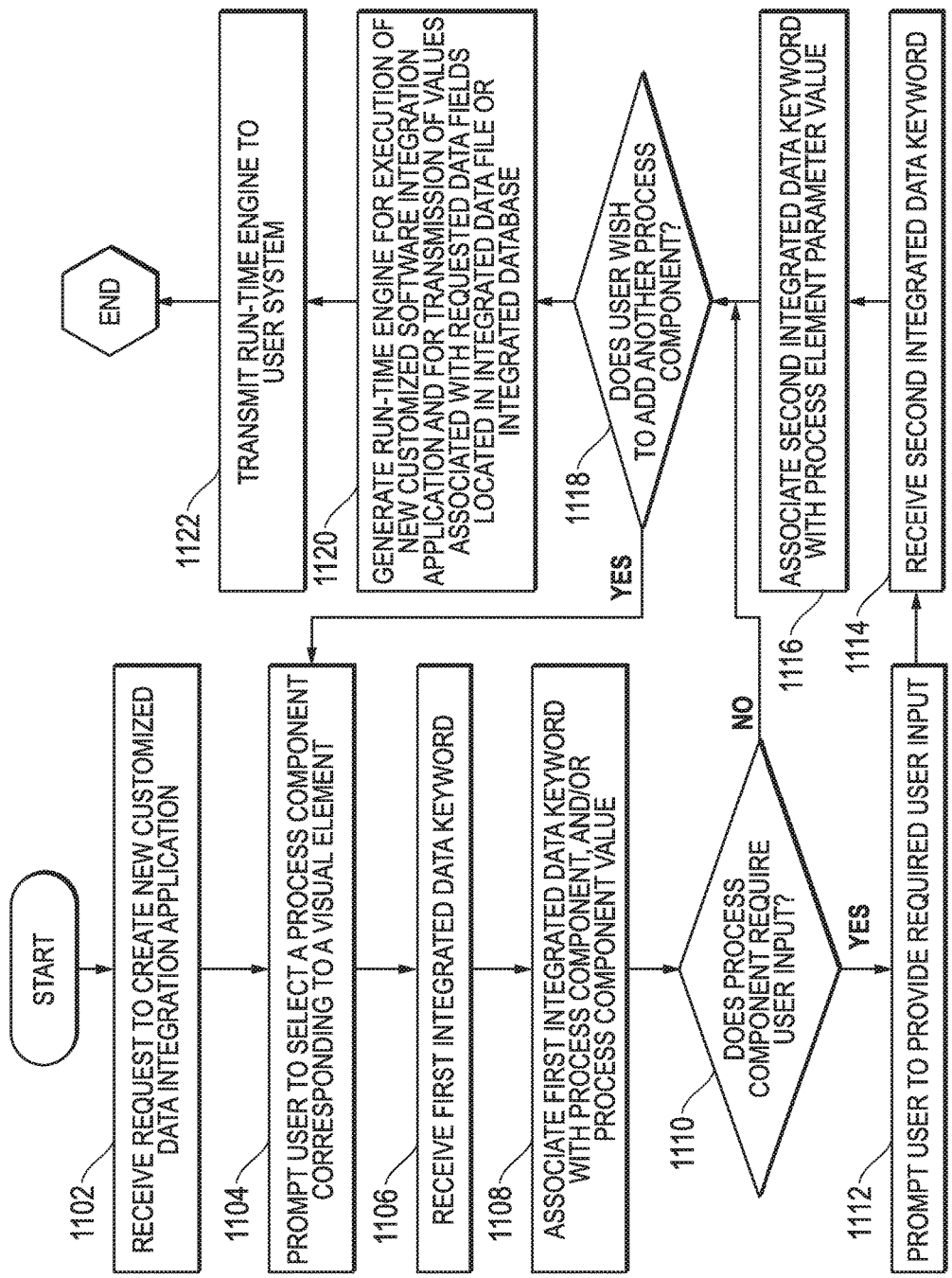
FIG. 11 is a flow diagram illustrating a method for generating a new customized software integration application according to an embodiment of the present disclosure.

FIG. 11 is a flow diagram illustrating a method for generating a new customized software integration application according to an embodiment of the present disclosure. In an embodiment, the method may include one or more of receiving a request from a user to create a new customized software integration application, prompting the user to select a process component corresponding to a visual element, receiving one or more first integrated data keywords associated with a user request to add a process component corresponding to a visual element, associating the one or more first integrated data keywords with a process component name, process component value, or process component operation position, and determining whether the process component requires user input. If the process component does not require user input, the method may proceed to determining whether the user wishes to add another process component. If the process component does require user input, the method in an embodiment may further include prompting the user to provide the required user input, receiving one or more second integrated data keywords associated with the required user input, associating the one or more second integrated data keywords with a process element parameter value, and determining whether the user wishes to add another process component. If the process component does not require user input, the method in an embodiment may proceed directly to determining whether the user wishes to add another process component. If the user does wish to add another process component, the method in an embodiment may return to the step of prompting the user to select a process component corresponding to a visual element. If the user does not wish to add another process component, the method in an embodiment may further include generating a run-time engine for execution of the new customized software integration application and for transmission of values associated with requested data fields located in the integrated data file or integrated database, and transmit the run-time engine to the user system.

At block 1102, in an embodiment, the voice recognition system may receive a voice command requesting the voice commanded integration application management system to create a new customized software integration application. The voice recognition system in such an embodiment may then associate the voice command with a machine-readable, executable code instruction to create a new customized software integration application and transmit that machine-readable, executable code instruction to the voice commanded integration application management system. For example, in an embodiment, if the voice commanded integration application management system determines no single, established customized software integration application currently exists that can provide requested information relating to the value of an integrated data field, as described above in reference to FIG. 8, the customized software integration application management system may prompt the user to create a new customized software integration application capable of providing the requested information relating to the value of the integrated data field. At block 1102, in an embodiment, the voice recognition system may receive a request to create a new customized software integration application in response to that prompt. The voice recognition system may then associate the voice command with a machine-readable, executable code instruction to create a new customized software integration application and transmit that code instruction to the voice commanded integration application management system. The method whereby the voice recognition system associates a voice command with a machine-readable, executable code instruction is described in greater detail below with reference to FIG. 13.

At block 1104, in an embodiment, the voice command interface module may prompt the user to select a process component corresponding to a visual element. As described above, a user may generate a process flow in an embodiment incorporating a visual user interface by providing a chronology of process-representing visual elements. The visual user interface in an embodiment may provide a menu of pre-defined user-selectable visual elements and permit the user to arrange them as appropriate to model a process. The elements may include visual, drag-and-drop icons representing specific units of work (known as process components) required as part of the integration process, such as invoking an application-specific connector, transforming data from one format to another, routing data down multiple paths of execution by examining the contents of the data, business logic validation of the data being processed, etc. In another aspect of an embodiment, the voice commanded integration application management system may prompt the user to select a process component corresponding to a visual element without the use of the visual user interface, but rather, via voice command.

For example, the voice command interface module in an embodiment may communicate to the voice recognition system an output statement such as "choose one of the following process components" followed by an output statement listing the available process components. The voice recognition system may then generate a digital audio file of an artificial voice speaking those output statements, and play the digital audio file to the end user via a speaker. The method by which the voice recognition system may generate a digital audio file of an artificial voice speaking an output statement is discussed in greater detail below.

At block 1106, in an embodiment, the voice command interface module may receive a first integrated data keyword associated with a user request to add a process component corresponding to a visual element. The voice recognition system in an embodiment may record a spoken user input in response to the prompt to select a process component, process that spoken user input, correlate the processed input to a first integrated data keyword, and transmit that first integrated data keyword to the voice command interface module. The voice spoken user input may include, but may not be limited to a name of a trading partner, a name of a process component action, a value of a process component action, a name of a process component parameter, and a value of a process component parameter. The voice command interface module may then receive the first integrated data keyword from the voice recognition system. For example, a user may request to query a database, and the voice recognition system may process that spoken user input, associate the processed spoken user input with a first integrated data keyword "database connector," and "query."

At block 1108, in an embodiment, the integrated data keyword correlation module may associate the first integrated data keyword associated with the request to add a process component with a process component, and/or a process component action value. The integrated data keyword correlation module in an embodiment may associate the first integrated data keyword associated with the request to add a process component with a process component, and/or a process component action value through the use of a integrated data keyword/component correlation table. For example, in one of the embodiments described with reference to FIG. 7, at rows 702 and 704, the integrated data keyword correlation module may associate the integrated data keyword "database connector" with the process component named "database connector," and may association the integrated data keyword "query" with the process component action value "query."

As discussed above, each process component may be identifiable by a process component type, and may further include an action to be taken. Each process component, when chosen using the visual user interface and added to the process flow in the visual user interface, may provide a drop down menu of different actions the process component may be capable of taking on the data as it enters that process step. The action the user chooses from the drop down menu may be associated with a process component value, which also may be associated with a connector codeset. Further, the graphical user interface in an embodiment may allow the user to define the parameters of process components by providing user input, which the customized data integration software application creation system may correlate with a data profile codeset, also stored in a memory of the customized data integration software application creation system.

As also discussed above, in an embodiment, a user may choose a process component it uses often when interfacing with a specific trade partner, and define the parameters of that process component by providing parameter values specific to that trading partner. If the user wishes to use this process component, tailored for use with that specific trading partner repeatedly, the user may save that tailored process component as a trading partner component, which will be associated with a trading partner codeset. For example, if the user often accesses the Walmart purchase orders database, the user may create a database connector process component, associated with a pre-built connector codeset that may be used with any database, then tailor the database connector process component to access the specific purchase order database owned and operated by Walmart by adding process component parameters associated with one or more data profile codesets. If the user uses this process component in several different integration processes, the user may wish to save this process component for later use by saving it as a trading partner component, which will be associated with a trading partner codeset. In the future, if the user wishes to use this component, the user may simply select the trading partner component, rather than repeating the process of tailoring a generic database connector process component with the specific parameters defined above.

At block 1110, in an embodiment, the application process component lookup module may determine whether the chosen process component requires further user input. As discussed above, each process component associated with a visual element may be identifiable by a process component type, and may further include an action to be taken. For example, a process component may be identified as a "connector" component. Each "connector" component, when chosen and added to the process flow in the visual user interface, may provide a drop down menu of different actions the "connector" component may be capable of taking on the data as it enters that process step. The action the user chooses from the drop down menu may be associated with a process component action value, which also may be associated with a connector codeset. Further, the graphical user interface in an embodiment may allow the user to define the parameters of process components by providing user input, which the customized data integration software application creation system may correlate with a data profile codeset, also stored in a memory of the customized data integration software application creation system. If a process component requires a process component action value, or a process component parameter value, and the established customized software integration application is not currently associated with an entry for each of those values, user input may be required in order to execute that established customized software integration application.

In an embodiment, the application process component lookup module may determine whether the chosen process component requires further user input by referencing an application process component lookup table. For example, in an embodiment where a user has requested to add a process component associated with a database connector, having a process component value "query," the application process component lookup module may determine that, in order to query a database to which the customized software integration application may connect, it must know the location for that database. For database connector process components in an embodiment, the name and location of the database to which the customized software integration application will connect is listed as a process component parameter. Thus, the application process component lookup module may determine that, in order for the process component "database connector," having a process component value "query," to operate, the user must provide the name and location of the database to which the customized software integration application will connect. In another example embodiment, where a user has requested to add a trading partner process component associated with a database connector having a process component value "query," the application process component lookup module may determine that it already knows the location for the database to be queried, because the user has previously tailored that database connector for interfacing with an established trading partner, such as Walmart or another substantial trading partner. If user input is required, flow may proceed to block 1112. If not, flow may proceed to block 1118.

At block 1112, in an embodiment, the voice command interface module may prompt the user to provide the required user input. The voice command interface module in an embodiment may communicate to the voice recognition system, an output request for the user to provide a required user input. For example, the voice command interface module may communicate to the voice recognition system an output request for the user to provide the name and location of the database to which the customized software integration application will connect. The voice recognition system may then generate a digital audio file of an artificial voice speaking the output request, and play the digital audio file for the end user via a speaker. The method by which the voice recognition system may generate a digital audio file of an artificial voice speaking an output statement is discussed in greater detail below. In other embodiments, a mix of voice recognition and graphical user interface prompts or other methods of receiving required responses from a user may be used. For example, the required user input may display an input window on a digital display device for response to a required input.

At block 1114, in an embodiment, the voice command interface module may receive the required user input in the form of one or more second integrated data keywords. In an embodiment, the voice recognition system may record a voice user input in response to the request for the user to provide required user input. The voice recognition system may also process the voice user input and associate it with one or more second integrated data keywords, then transmit those one or more second integrated data keywords to the voice command interface module. For example, the voice recognition system in an embodiment may record a voice user input of "Query Joe's TV purchase order database" in response to the request for the user to provide the name and location of the database to which the customized software integration application will connect. The voice recognition system may process this voice user input and associate it with the second integrated data keywords "Joe's TV," "Database Connector," "Query," and "purchase order." The method by which the voice recognition system processes voice user inputs and associates the processed signals with integrated data keywords is discussed in greater detail below with reference to FIG. 13.

At block 1116, in an embodiment, the integrated data keyword correlation module may associate second integrated data keywords representing the user input with a process element parameter value. In an embodiment, the integrated data keyword correlation module may associate the second integrated data keywords representing the user input with a process element parameter value using the integrated data keyword/component correlation table. For example, in one of the embodiments described with reference to FIG. 7, at rows 706 and 708, the integrated data keyword correlation module may associate the second integrated data keyword "Joe's TV" with a process parameter "host name" having a value "Joe's TV," and associate the second integrated data keyword "purchase order database" with the process parameter "database name" having a value "purchase orders."

At block 1118, in an embodiment, the voice commanded integration application management system may determine whether the user wishes to add another process component. In an embodiment, the voice command interface module may communicate to the voice recognition system, an output request to choose whether to add another process component. The voice recognition system may then generate a digital audio file of an artificial voice speaking the output request, and play the digital audio file for the end user via a speaker. The method by which the voice recognition system may generate a digital audio file of an artificial voice speaking an output statement is discussed in greater detail below.

In an embodiment, the voice recognition system may then record a voice user input in response to the request, process that voice user input and associate the processed voice user input with a machine-readable, executable code instruction to either add another process component or complete the new customized software integration application. The voice recognition system may then transmit the machine-readable, executable code instruction to the voice commanded data integration management system for execution. The method by which the voice recognition system processes the voice user input and associates the processed voice user input with a machine-readable, executable code instruction to either add another process component or complete the new customized software integration application is discussed in greater detail below. If the voice command interface module receives a machine-readable, executable code instructions to add another process component, the method may move to block 1104, again prompting the user to select a process component the user would like to add. If the voice command interface module receives a machine-readable, executable code instruction to complete the new customized software integration application, the method may move to block 1120.

At block 1120, in an embodiment, the voice commanded integration application management system may generate a run-time engine for the execution of the new customized software integration application and for transmission of the values associated with the requested data fields located in the integrated data repository to the voice commanded integration application management system. As discussed above, the system provider server/system in an embodiment may generate a dynamic runtime engine for executing pre-defined subsets of code instructions correlated to each individual process component in a given flow chart in the order in which they are modeled in the given flow chart. The customized data integration software integration application in an embodiment is the set of code instructions represented by the process reflected in the flow chart created by the user, along with sets of code instructions correlating to received user input, and along with the dynamic runtime engine that executes these sets of code instructions. These sets of codes may take the form of connector codesets, trading partner codesets, or data profile codesets. As an example, the voice commanded integration application management system may generate a run-time engine called "JoesTVPOtoO-B.exe" for the execution of a new customized software integration application operating to calculate the projected sales to Joes TV for the first quarter of 2017.

Upon generation of the run-time engine at block 1120, the voice commanded integration application management system may also configure the customized software integration application to be executable with one or more connector codesets, and/or data profile codesets. In an embodiment, the voice commanded integration application management system may configure the customized software integration application to be executable with the connector codeset associated with the process component and process component value identified in block 1108, and to be executable with the data profile codeset associated with the process element parameter and process element parameter value identified in block 1116. As discussed above, a customized software integration application in an embodiment may include a dynamic runtime engine which is an executable software application capable of running on a computer within the enterprise's network or within a third party network located remotely from both the provider of the website and the enterprise network, at least one of a connector codeset and a trading partner codeset, and optionally, one or more data profile codesets. The dynamic runtime engine, when initiated, in an embodiment, may download all connector codesets, trading partner codesets, and data profile codesets associated with the run-time engine, and execute those code instructions to perform the integration process modeled by the visual flowchart generated by the user.

As discussed above, an integration application process component represented by a visual element in an embodiment may correspond to a modeled integration process defined in a connector codeset, but may not itself be configured for use with any particular enterprise, or any particular trading partner. Accordingly, the connector codeset corresponding to a process component may not yet be ready for execution to provide business integration functionality for any particular trading partner or enterprise until the connector codeset corresponding to a process component is configured to be executable with additional code and/or data in the form of one or more integration data profile codesets incorporating user-specific information.

At block 1120, in an embodiment, the voice commanded integration application management system may configure the connector codesets or trading partner codesets associated with the customized software integration application to be executable with any associated data profile codesets. For example, the voice commanded integration application management system in one of the embodiments described with reference to FIG. 6 may configure the connector codesets associated with the process component "database connector," having a process component value "query" to be configurable with the data profile codeset associated with the process parameter "host name" having a value "Joe's TV," and associate the process parameter "database name" having a value "purchase orders."

At block 1122, in an embodiment, the voice commanded integration application management system may transmit the run-time engine to the user system. As discussed above, the dynamic runtime engine may be located anywhere outside the service provider server/system. For example, the dynamic runtime engine may reside within the enterprise network, or may reside at a third party server located remotely from both the service provider server/system and the enterprise network. Upon the user's initiation of the dynamic runtime engine, the dynamic runtime engine in an embodiment may submit a request to the service provider server/system to download all codesets associated with the runtime engine from the service provider server/system, and execute those codesets at the location of the runtime engine.

Figure 12:
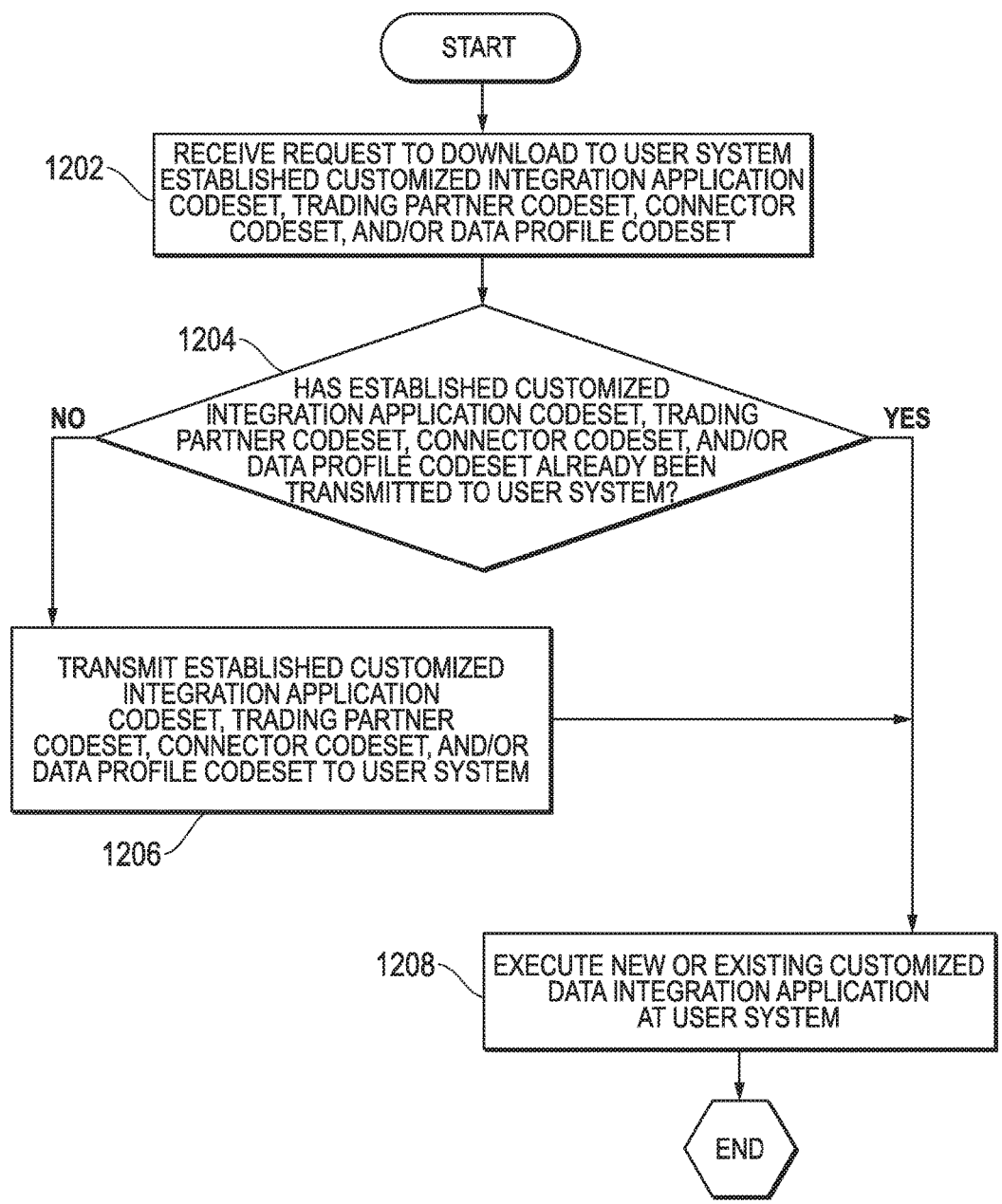
FIG. 12 is a flow diagram illustrating a method of executing a new or existing customized software integration application at a user system according to an embodiment of the present disclosure.

FIG. 12 is a flow diagram illustrating a method of executing a new or existing customized software integration application at a user system. This method may include one or more of receiving a request to download to the user system an established customized software integration application codeset, a trading partner codeset, a connector codeset, and/or a data profile codeset, determining whether the established customized integration application codeset, trading partner codeset, connector codeset, and/or data profile codeset has already been transmitted to the user system, and if one of those codesets has not been transmitted to the user system, transmitting the requested codeset. If the requested codesets have been transmitted to the user system, the runtime engine may execute the customized software integration application at the user system by executing the transmitted codesets.

At block 1202 in an embodiment, the customized data integration software application management system may receive a request to download to the user system an established customized software integration application codeset, a trading partner codeset, a connector codeset, and/or a data profile codeset. As discussed above, a dynamic runtime engine for executing an integration application template and integration process data profile codeset according to an integration process modeled by a user-generated visual flowchart may have been generated and transmitted to the user system. In an embodiment, the dynamic runtime engine, when initiated, may download all code sets associated with the runtime engine, and execute those code instructions to perform the integration process modeled by the visual flowchart or non-visual integration flow generated by the user. The customized data integration software application in an embodiment may comprise the combination of a dynamic runtime engine, at least one connector codeset, and/or trading partner codeset, and may also include one or more data profile codesets.

The dynamic runtime engine may be located anywhere outside the service provider server/system. For example, the dynamic runtime engine may reside within the enterprise network, or may reside at a third party server located remotely from both the service provider server/system and the enterprise network. Upon the user's initiation of the dynamic runtime engine, the dynamic runtime engine in an embodiment may submit a request to the service provider server/system to download to the user system an established customized software integration application codeset, a trading partner codeset, a connector codeset, and/or a data profile codeset associated with the runtime engine.

As an example, in the embodiment described with reference to FIG. 5, the dynamic runtime engine "WalmartPOtoOB.exe," listed in column 518 may be initiated and the customized data integration software application management system within the service provider's server/system may receive a request to download the "Walmart Purchase Orders to Overall Budget" customized software integration application codesets.

As a further example, in one of the embodiments described with reference to FIG. 6, the dynamic runtime engine "JoesTVPOtoOB.exe" may be initiated and the customized data integration software application management system within the service provider's server/system may receive a request from that runtime engine to download several additional aspects. For example, the request may be to download the connector codeset associated with the process component "database connector," having a process component value "query," the data profile codeset associated with the process component parameter "host name," and having a process component parameter value "Joe's TV." Further, downloads in an example embodiment may include the data profile codeset associated with the process component parameter "database name," having a value "purchase orders," the data profile codeset associated with the process component parameter "user name," having a value "Admin1," the data profile codeset associated with the process component parameter "password," having a value "PASS," and the connector codeset associated with the process component type "program command," having a value "filter." In addition in an embodiment, also downloads may include the data profile codeset associated with the process component parameter "vendor," having a value "user," the data profile codeset associated with the process component parameter "total amount due," having a value "all," and the data profile codeset associated with the process component parameter "due date," having a value "1/1/17-3/31/17." Further, the additionally downloaded may be the connector codeset associated with the process component "data process," having a value "combine," the connector codeset associated with the process component "database connector," having an action value "insert," the data profile codeset associated with the process component parameter "database name," having a value "Overall budget," the data profile associated with the process component parameter "column location," having a value "Joe's TV Sales," and the connector codeset associated with the process component type "database connector," having an action value "query." And an additional download may include the data profile codeset associated with the process component parameter "database name," having a value "overall budget," and a data profile codeset associated with the process component parameter "cell location," having a value "Joe's TV Sales TOTAL" in the example embodiment.

At block 1204, the customized data integration software application management system in an embodiment may determine whether all of the codesets associated with the run-time engine have been transmitted to the enterprise network. If the customized data integration software application creation system determines any of the integration application templates or data profile code sets associated with the dynamic runtime engine have not already been transmitted to the enterprise network, the method may move to block 1206. If the customized data integration software application creation system determines the customized data integration software application has already been transmitted to the enterprise network, the method may move to block 1208. For example, the run-time engine WalmartPOtoOB.exe described with reference to FIG. 5 may be associated with an established customized software integration application that existed prior to the user's request to calculate the projected sales to Walmart for the first quarter of 2017. Since the run-time engine WalmartPOtoOB.exe is associated with a pre-established customized software integration application, the run-time engine may have downloaded all codesets associated with the customized software integration application "Walmart Purchase Orders to Overall Budget" previously, and thus, may have already downloaded all of the associated codesets.

In contrast, a user may have had to generate a new customized software integration application in order to provide a response to the request to calculate projected sales to Joe's TV for the first quarter of 2017. In that case, since the customized software integration application has just been created, and the run-time engine has just been transmitted to the end-user, the run-time engine, upon first startup, may not have ever downloaded any of the codesets associated with it.

At block 1206, in an embodiment, the customized data integration software application management system may transmit the customized software integration application including any connector codesets, trading partner codesets, or data profile codesets associated with the runtime engine to the enterprise network. As an example, in the embodiment described with reference to FIG. 6, the customized software integration application management system may transmit to the runtime engine JoesTVPOtoOB.exe the connector codeset associated with the process component "database connector," having a process component value "query," the data profile codeset associated with the process component parameter "host name," having a process component parameter value "Joe's TV," the data profile codeset associated with the process component parameter "database name," having a value "purchase orders," the data profile codeset associated with the process component parameter "user name," having a value "Admin1," the data profile codeset associated with the process component parameter "password," having a value "PASS," the connector codeset associated with the process component type "program command," having a value "filter," the data profile codeset associated with the process component parameter "vendor," having a value "user," the data profile codeset associated with the process component parameter "total amount due," having a value "all," the data profile codeset associated with the process component parameter "due date," having a value "1/1/17-3/31/17," the connector codeset associated with the process component "data process," having a value "combine," the connector codeset associated with the process component "database connector," having an action value "insert," the data profile codeset associated with the process component parameter "database name," having a value "Overall budget," the data profile associated with the process component parameter "column location," having a value "Joe's TV Sales," the connector codeset associated with the process component type "database connector," having an action value "query," the data profile codeset associated with the process component parameter "database name," having a value "overall budget," and a data profile codeset associated with the process component parameter "cell location," having a value "Joe's TV Sales TOTAL."

At block 1208, in an embodiment, a dynamic runtime engine may execute the integration application template and the integration process data profile codeset according to the user-generated visual flowchart modeling the requested process. In an embodiment, once the dynamic runtime engine receives from the customized data integration software application creation system all integration application templates and data profile code sets associated with the dynamic runtime engine, it may execute the integration application template and the integration process data profile codeset according to the user-generated visual flowchart modeling the requested process. For example, in one of the embodiments described with reference to FIG. 6, the JoesTVPOtoOB.exe runtime engine may execute all of the codesets associated with it to query Joe's TV database named "purchase orders" with the user name "Admin1" and password "PASS," filter the query results to only include values for the total amounts due during the first quarter of 2017 to the user, combine all of those values into a single document, insert those values into the column "Joe's TV Sales" in the user database "overall budget," and query the user database "overall budget" for the value of the cell "Joe's TV Sales TOTAL," which adds up all of the values for the total amounts due to User from Joe's TV in the first quarter of 2017. In such a way, the run-time engine in an embodiment may execute a customized software integration application and receive a specific value in response to the user's request to "calculate projected sales to Joe's TV for the first quarter of 2017."

Figure 13:
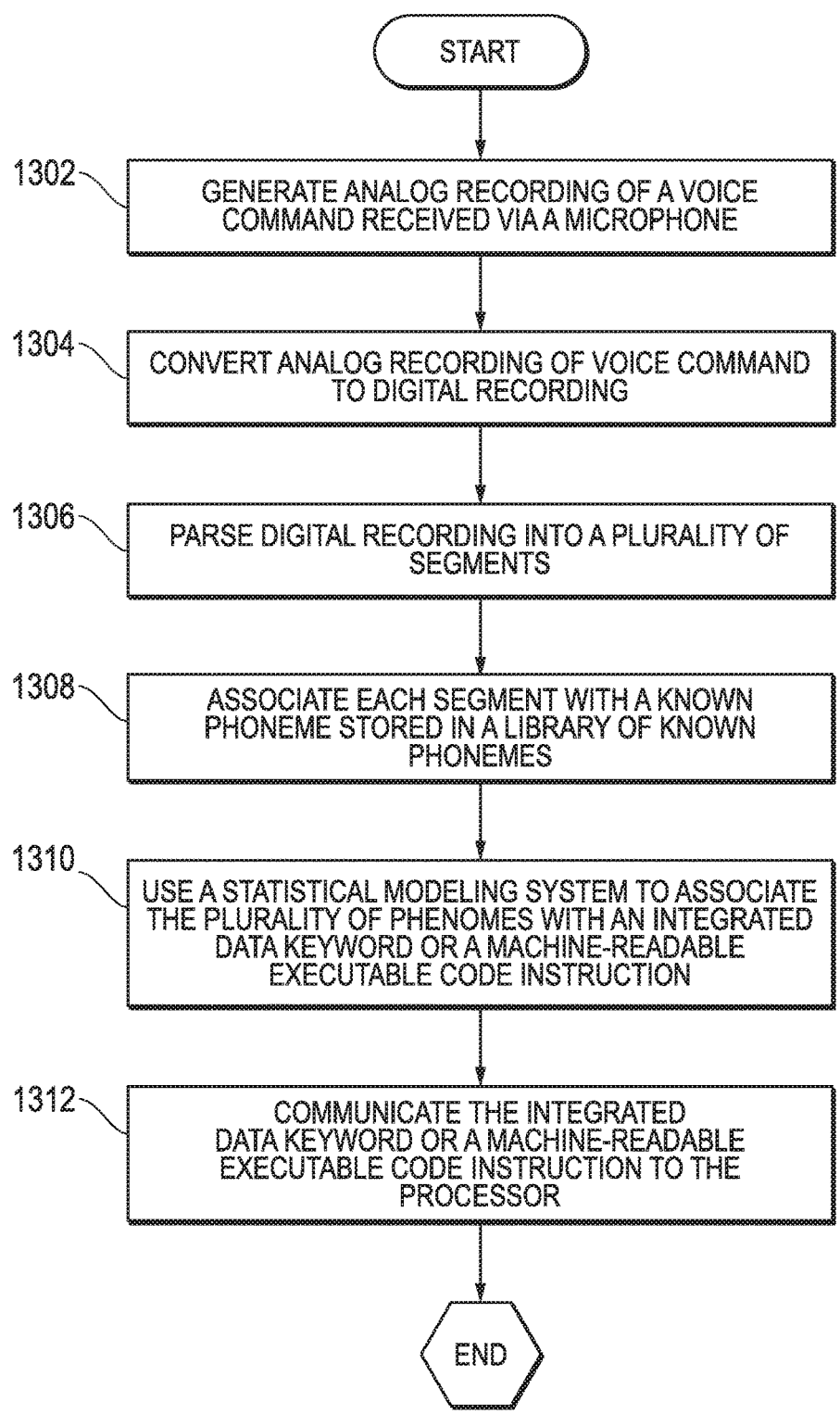
FIG. 13 is a flow diagram illustrating a method of associating a voice user input with an integrated data keyword according to an embodiment of the present disclosure.

FIG. 13 is a flow diagram illustrating a method of associating a voice user input with an integrated data keyword according to an embodiment of the present invention. The method may include one or more of generating an analog recording of a voice command received from the user via a microphone, converting the analog recording of the voice command to a digital recording, parsing the digital recording into a plurality of segments, associating each segment with a known phoneme stored in a library of known phonemes, using a statistical modeling system to associate the plurality of phonemes with an integrated data keyword or a machine-readable, executable code instruction, and/or communicating the integrated data keyword or machine-readable, executable code instruction to the processor.

At block 1302, in an embodiment, the voice recognition system may generate an analog recording of a voice command received via a microphone. In an embodiment, a user may speak and the voice recognition system may record a user voice command. The voice recognition system in an embodiment may record the voice command via a microphone, and generate an analog recording of the voice command.

At block 1304, in an embodiment, the voice recognition system may convert the analog recording of the voice command into a digital recording. In an embodiment, the voice recognition system may convert the analog recording of the voice command generated at block 1302 into a digital recording for further signal processing. The voice recognition system may use any one of well-known analog-to-digital converters (ADC) in order to translate the analog wave of the voice command into digital data that the processor may understand. The conversion from analog recording to digital recording may involve one or more of digitizing the sound by taking precise measurements of the analog wave at frequent intervals, filtering the digitized sound to remove unwanted noise, separating the digitized sound into different bands of frequency, normalizing the sound, and/or temporally aligning the digitized sound wave to match the speed of the digitized wave to the speed of known phonemes stored in a memory of the voice recognition system. It is understood that in some embodiments, a digital recording may be taken in the first instance and analyzed against known phonemes rather than recording in analog and converting to digital.

At block 1306, in an embodiment, the voice recognition system may parse the digital recording into a plurality of segments. In an embodiment, the voice recognition system may separate the digitized signal into small segments as short as a few hundredths of a second, or even thousandths of a second, in order to parse the digital recording into pieces small enough for the voice recognition software to identify individual consonants spoken by the user.

At block 1308, in an embodiment, the voice recognition system may associate each segment with a known phoneme stored in a library of known phonemes. A phoneme is the smallest element of a language, and is a representation of the sounds humans make and put together to form meaningful expressions in language. There are roughly 40 phonemes in the English language. The voice recognition system may have libraries corresponding to phonemes in any known language, not just English. The voice recognition system may have a phoneme library including digitized signals representing each phoneme stored in a memory. The voice recognition system may compare the parsed segments of the digitized recording of the user voice command to one or more of the known phonemes in order to associate each segments with a known phoneme.

At block 1310, in an embodiment, the voice recognition system may use a statistical modeling system to associate the plurality of phonemes with an integrated data keyword or a machine-readable, executable code instruction. In an embodiment, the voice recognition system may use one of several known statistical modeling systems to examine each identified phoneme in the context of the other identified phonemes around it, run the contextual phoneme plot through the statistical model, and compare the contextual phoneme plot to a large library of known words, phrases, and sentences. Statistical models used may include, but are not limited to, the Hidden Markov Model and neural networks.

The library of integrated data keywords may be based upon a generalized library of integrated data keywords including words and phrases commonly used to instruct the processing of most computer programs, such as open, close, execute, go to, search, play, stop, call, message, calendar, or note, for example. In other aspects of an embodiment, the library of integrated data keywords may also contain words and phrases specific to the creation of customized software integration applications, the specific customized software integration applications available to an authorized user, and/or specific to the functionalities of the voice commanded integration application management system, such as "add connector," "add trading partner," and/or "define component parameter," for example. Each of the integrated data keywords given above are only a few examples of potential integrated data keywords and are not meant to limit the scope of this disclosure.

The voice recognition system in an embodiment may thus determine what the user was probably saying and either output the voice command as text or as a computer command. In a particular embodiment, the voice recognition system may output the results of the statistical modeling analysis in the form of a computer command identifying one or more integrated data keywords.

At block 1312, in an embodiment, the voice recognition system may communicate the integrated data keywords or machine-readable, executable code instructions to the processor. In an embodiment, the voice recognition system may communicate the text or computer command resulting from the statistical modeling analysis to the voice command interface module to instruct further functionality of the voice commanded integration application management system. For example, the voice recognition system may communicate the results of the statistical modeling analysis to the voice command interface module in the form of a computer command identifying one or more integrated data keywords, or a computer command for the processor to perform a specific action.

Figure 14:
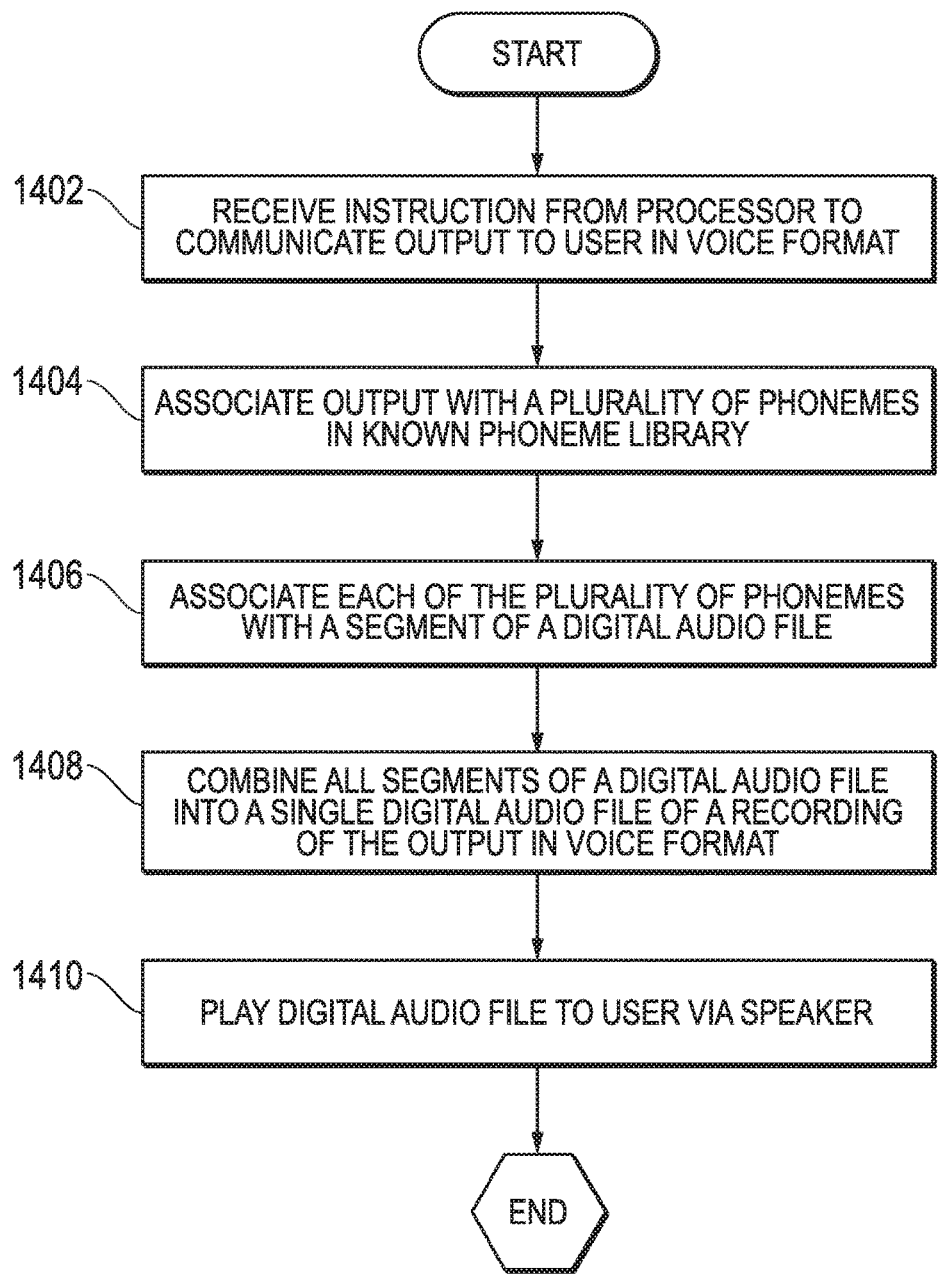
FIG. 14 is a flow diagram illustrating a method of generating and playing a digital audio file communicating a computer output to the user according to an embodiment of the present disclosure.

FIG. 14 is a flow diagram illustrating a method of generating and playing a digital audio file communicating a computer output to the user according to an embodiment of the present disclosure. The method may include one or more of receiving an instruction from the processor to communicate a computer output to the user in voice format, associating the output with a plurality of phonemes in a known phoneme library, associating each of the plurality of identified phonemes with a segment of a digital audio file, combining all segments of a digital audio file into a single digital audio file of a recording of the output in a voice format, and playing a digital audio file to the user via a speaker.

At block 1402, in an embodiment the voice recognition system may receive an instruction from the processor to communicate a computer output to a user in voice format. In an embodiment, the voice recognition system may receive an instruction from the processor, and more specifically, from the voice command interface module, to communicate a computer output to a user in voice format. For example, the voice command interface module may instruct the voice recognition system to communicate a request for user input, or communicate the output of a customized software integration application to the user in a voice format. The voice recognition system may receive this instruction in the form of machine-readable, executable code instruction including the text of the computer output to be communicated to the user in voice format, and the instruction to translate the text of the computer output to voice format.

At block 1404, in an embodiment the voice recognition system may associate the computer output with a plurality of phonemes in the library of known phonemes. In an embodiment, the voice recognition system may associate each word of the text of the computer output with a phoneme in a library of known phonemes. As discussed above, a phoneme is the smallest element of a language, and is a representation of the sounds humans make and put together to form meaningful expressions in language. There are roughly 40 phonemes in the English language. The voice recognition system may have libraries corresponding to phonemes in any known language, however. The voice recognition system may have a phoneme library including digitized signals representing each phoneme stored in a memory.

At block 1406, in an embodiment the voice recognition system may associate each of the plurality of phonemes with a segment of a digital audio file. The voice recognition system in an embodiment may have a library of speech units stored in memory, and each speech unit be associated with one of the known phonemes in the phoneme library. A speech unit associated with a known phoneme may comprise a digital recording of a voice speaking the known phoneme. Each of the plurality of phonemes identified in step 1404 may be associated with a speech unit digital audio file in an embodiment.

At block 1408, in an embodiment the voice recognition system may combine or concatenate all segments of a digital audio file into a single digital audio file of a recording of the output in voice format. In an embodiment, the voice recognition system may combine or concatenate all of the speech unit digital audio files identified in step 1406 together into a single digital audio file. The combined single digital audio file in an embodiment may synthesize speech corresponding to the full computer output received by the voice recognition system in step 1402 above.

At block 1410, in an embodiment the voice recognition system may play the digital audio file to the user via a speaker. In an embodiment, the voice recognition system may play the combined single digital audio file generated in step 1408 above to the user via a microphone. When played, the combined single digital audio file generated in step 1408 may sound like a human voice speaking the full computer output received by the voice recognition system in step 1402 above. For example, the voice recognition system in an embodiment may play a combined single digital audio file via a speaker, which may sound like a human voice speaking a request for user input, or speaking the value of an output of a customized software integration application to the user in a voice format.

The blocks of the flow diagrams discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a voice commanded integration application management system comprising:
   a memory for storing an established customized software integration application for a specific integration process for transforming data to enable electronic data exchange between data formats, and the memory for storing one or more internal data records associating the established customized software integration application with an authorized user, and a run-time engine;
   a processor operatively connected to the memory, the processor receiving a first integrated data keyword from a voice recognition software system requesting access to the specific integration process on behalf of a user, and associating a first integrated data keyword with the established customized software integration application;
   the processor receiving user authorization and releasing the established customized software integration application for download by the user;
   wherein the established customized software integration application for the specific integration process was generated from a customized visual model with a plurality of visual modeling elements selected from a menu of visual modeling elements, each visual modeling element including:
      a connector code set comprising data required for electronic communication in accordance with a specific application programming interface (API); or
      a trading partner code set comprising data required for electronic communication with a specific trading partner's system.

2. The information handling system operating the voice commanded integration application management system of claim 1 further comprising:
   the processor determining the established customized software integration application requires a user input; and
   the processor receiving a second integrated data keyword from the voice recognition software system in response to the user input request and associating the second integrated data keyword with a stored data profile codeset responsive to the required user input.

3. The information handling system operating the voice commanded integration application management system of claim 2 further comprising:
   the processor configuring the established customized software integration application to be executable with the responsive stored data profile codeset.

4. The information handling system operating the voice commanded integration application management system of claim 1 further comprising:
   a microphone for receiving a first voice user input for interpretation by the voice recognition software system;
   the memory for further storing the first voice user input, a library of known phonemes, and a library of known integrated data keywords;
   the voice recognition software system associating the first voice user input with a first plurality of phonemes from a library of known phonemes and using a statistical modeling system to associate the first plurality of phonemes with the first integrated data keyword.

5. The information handling system operating the voice commanded integration application management system of claim 4 wherein the first voice user input comprises one or more of a name of the established customized software integration application, or a name of the specific trading partner.

6. The information handling system operating the voice commanded integration application management system of claim 2 wherein the second integrated data keyword comprises a name of a process component or a value of a process component, and wherein the name of the process component or the value of the process component are associated with one connector codeset.

7. The information handling system operating the voice commanded integration application management system of claim 1 further comprising:
   the processor transmitting to a user system the established customized software integration application including a run-time engine executing at least one of the connector code set or the trading partner code set.

8. The information handling system operating the voice commanded integration application management system of claim 7 further comprising:
the processor transmitting machine-readable, executable code instructions instructing the run-time engine to perform the specific integration process for transforming data to enable electronic data exchange between data formats; and
the processor receiving from the run-time engine the one or more data elements produced by execution of the established customized software integration application.

9. A method for managing hybrid data integration applications via voice command comprising:
receiving a first integrated data keyword from a voice recognition software system requesting access to a specific integration process on behalf of a user, and associating the first integrated data keyword with an established customized software integration application for executing the specific integration process for transforming data to enable electronic data exchange between data formats;
receiving user authorization and releasing the established customized software integration application for download by the user;
wherein the voice recognition software system receives a first voice user input, associates the first voice user input with the first integrated data keyword; and
wherein the established customized software integration application was generated from a customized visual model with a plurality of visual modeling elements selected from a menu of visual modeling elements, each visual modeling element being associated with a respective one of:
a connector code set comprising data required for electronic communication in accordance with a specific application programming interface (API); or
a trading partner code set comprising data required for electronic communication with a specific trading partner's system.

10. The method for managing hybrid data integration applications via voice command of claim 9 further comprising:
determining the established customized software integration application requires a user input;
transmitting a machine-readable executable user input request to the voice recognition software system; and
receiving a responsive second integrated data keyword from the voice recognition software system in response to the user input request and associating the third integrated data keyword with a stored data profile codeset for release to the user.

11. The method for managing hybrid data integration applications via voice command of claim 10 further:
configuring the established customized software integration application to be executable with the stored data profile codeset responsive to the required user input.

12. The method for managing hybrid data integration applications via voice command of claim 10 further comprising:
interpreting the first voice user input with a first plurality of phonemes and associating a second voice user input with a second plurality of phonemes, using a statistical modeling system to associate each of the first and second pluralities of phonemes with the first integrated data keyword and the second integrated data keyword, respectively, and communicating the first and the second integrated data keywords to the processor.

13. The method for managing hybrid data integration applications via voice command of claim 12 wherein receiving user authorization includes receiving a third integrated data keyword identifying the user from the voice recognition software system, associating the third integrated data keyword with user authorization for the established customized software integration application.

14. The method for managing hybrid data integration applications via voice command of claim 9 further comprising:
transmitting machine-readable, executable code instructions instructing the run-time engine of the established customized software integration application on a user system to execute the specific integration process for transforming data to enable electronic data exchange between data formats; and
receiving from the run-time engine the one or more data elements produced by execution of the established customized software integration application.

15. The method for managing hybrid data integration applications via voice command of claim 14 further comprising:
transmitting the one or more data elements produced by execution of the established customized software integration application to the voice recognition software system;
generating a digital audio recording of an artificial voice speaking the one or more data elements; and
playing for the user, via a speaker, the digital audio recording of the artificial voice speaking the one or more data elements.

16. An information handling system operating a voice commanded integration application management system comprising:
a memory for storing a new customized software integration application for a specific integration process for transforming data to enable electronic data exchange between data formats, one or more internal data records associating the new customized software integration application with one or more of a trading partner codeset comprising data required for electronic communication with a specific trading partner's system, a connector codeset comprising data required for electronic communication in accordance with a specific application programming interface (API), a stored data profile codeset, and a run-time engine;
a processor receiving a machine-readable, executable code instruction from a voice recognition software system instructing the processor to create the new customized software integration application for the specific integration process, and the processor creating the new customized software integration application including at least one trading partner codeset or connector codeset and at least one stored data profile codeset;
the processor receiving a first integrated data keyword from the voice recognition software system associating the first integrated data keyword with at least one of the trading partner codeset or the connector codeset and releasing the trading partner codeset or the connector codeset for download by the user;
the processor receiving a second integrated data keyword from the voice recognition software system and associating the second integrated data keyword with a stored data profile codeset, and releasing the stored data profile codeset for download by the user;

the voice recognition software system receiving a voice command from the user to create the new customized software integration application; and the voice recognition software system associating the voice command with the machine-readable, executable code instruction instructing the processor to create the new customized software integration application.

17. The information handling system operating the voice commanded integration application management system of claim 16 further comprising:

the voice recognition software system receiving a first voice input in response to a first user input request and correlating the first voice input with the second integrated data keyword; and the recognition software system receiving a second voice input in response to a second user input request and correlating the second voice input with a third integrated data keyword.

18. The information handling system operating the voice commanded integration application management system of claim 16 further comprising:

a microphone for receiving the voice command and voice user inputs for interpretation by the voice recognition software system;

the voice recognition software system interpreting the voice command by associating it with a plurality of phonemes, and using a statistical modeling system with the associated plurality of phonemes to identify the machine-readable, executable code instruction instructing the processor to create the new customized software integration application.

19. The information handling system operating the voice commanded integration application management system of claim 16 further comprising:

the processor transmitting to a user system the new customized software integration application for the specific integration process for transforming data to enable electronic data exchange between data formats;

wherein the new customized software integration application comprises the run-time engine operating to execute machine-readable, executable code instructions incorporating at least one of the connector code set or the trading partner code set.

20. The information handling system operating the voice commanded integration application management system of claim 19 further comprising:

a speaker for playing a digital audio recording of an artificial voice speaking;

the processor transmitting the one or more data elements produced by the execution of the new customized software integration application to the voice recognition software system;

the voice recognition software system generating the digital audio recording of the artificial voice speaking the one or more data elements; and the voice recognition software system playing for the user the digital audio recording of the artificial voice speaking the one or more data elements via the speaker.

* * * * *